(12) United States Patent
Meissner et al.

(10) Patent No.: US 12,031,886 B2
(45) Date of Patent: Jul. 9, 2024

(54) SENSOR ASSEMBLY FOR MEASURING AT LEAST A FIRST TORSION OF A ROTOR BLADE OF A WIND TURBINE GENERATOR SYSTEM

(71) Applicant: DR. JOHANNES HEIDENHAIN GmbH, Traunreut (DE)

(72) Inventors: Markus Meissner, Uebersee (DE); Franz Langrieger, Trostberg (DE); Siegfried Reichhuber, Stein an der Traun (DE); Stefan Gilg, Trostberg (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 0 days.

(21) Appl. No.: 18/076,434

(22) Filed: Dec. 7, 2022

(65) Prior Publication Data
US 2023/0175917 A1 Jun. 8, 2023

(30) Foreign Application Priority Data
Dec. 8, 2021 (DE) ...................... 10 2021 213 938.8

(51) Int. Cl.
*G01M 5/00* (2006.01)
*F03D 17/00* (2016.01)
*G01D 5/28* (2006.01)

(52) U.S. Cl.
CPC ........... *G01M 5/0058* (2013.01); *F03D 17/00* (2016.05); *G01D 5/28* (2013.01); *F05B 2260/83* (2013.01)

(58) Field of Classification Search
CPC ............. G01M 5/0058; G01M 5/0016; G01M 5/0041; G01M 5/0091; F03D 17/00;
(Continued)

(56) References Cited

U.S. PATENT DOCUMENTS

| 3,938,890 A | 2/1976 | Flavell |
| 10,578,427 B2 | 3/2020 | Müller et al. |

(Continued)

FOREIGN PATENT DOCUMENTS

| DE | 3405886 A1 | 8/1985 |
| DE | 10219664 A1 | 11/2003 |

(Continued)

*Primary Examiner* — Thanh Luu
*Assistant Examiner* — Monica T Taba
(74) *Attorney, Agent, or Firm* — LEYDIG, VOIT & MAYER, LTD.

(57) ABSTRACT

A sensor assembly for measuring a torsion of a rotor blade of a wind turbine generator system includes a first light source configured to generate light and a first transmitter-side polarizer disposed downstream thereof in a direction of light propagation and configured to generate linearly polarized light as a first transmission light. A second light source is configured to generate unpolarized light as a second transmission light. First and second detector elements are arranged and adapted to receive the first and second transmission light. A first receiver-side polarizer is disposed upstream of the first detector element in the direction of light propagation and a second receiver-side polarizer is disposed upstream of the second detector element in the direction of light propagation. An orientation of a polarization plane of the first receiver-side polarizer and an orientation of a polarization plane of the second receiver-side polarizer are different from one another.

20 Claims, 18 Drawing Sheets

(58) Field of Classification Search
CPC . G01D 5/28; F05B 2260/83; F05B 2270/804; Y02E 10/72; G01B 11/168
See application file for complete search history.

(56) References Cited

U.S. PATENT DOCUMENTS

| | | |
|---|---|---|
| 2010/0053615 A1 | 3/2010 | Angood et al. |
| 2015/0234050 A1* | 8/2015 | Larson ............... G02B 27/0101 356/369 |
| 2016/0209396 A1* | 7/2016 | Bordelon ........... A61B 5/14532 |

FOREIGN PATENT DOCUMENTS

| | | |
|---|---|---|
| DE | 102010005665 A1 | 7/2011 |
| DE | 102016125730 A1 | 6/2018 |
| DE | 102017131388 A1 | 7/2019 |
| EP | 3467463 A1 | 4/2019 |
| WO | WO 9221933 A1 | 12/1992 |
| WO | WO 2021064243 A1 | 4/2021 |

\* cited by examiner

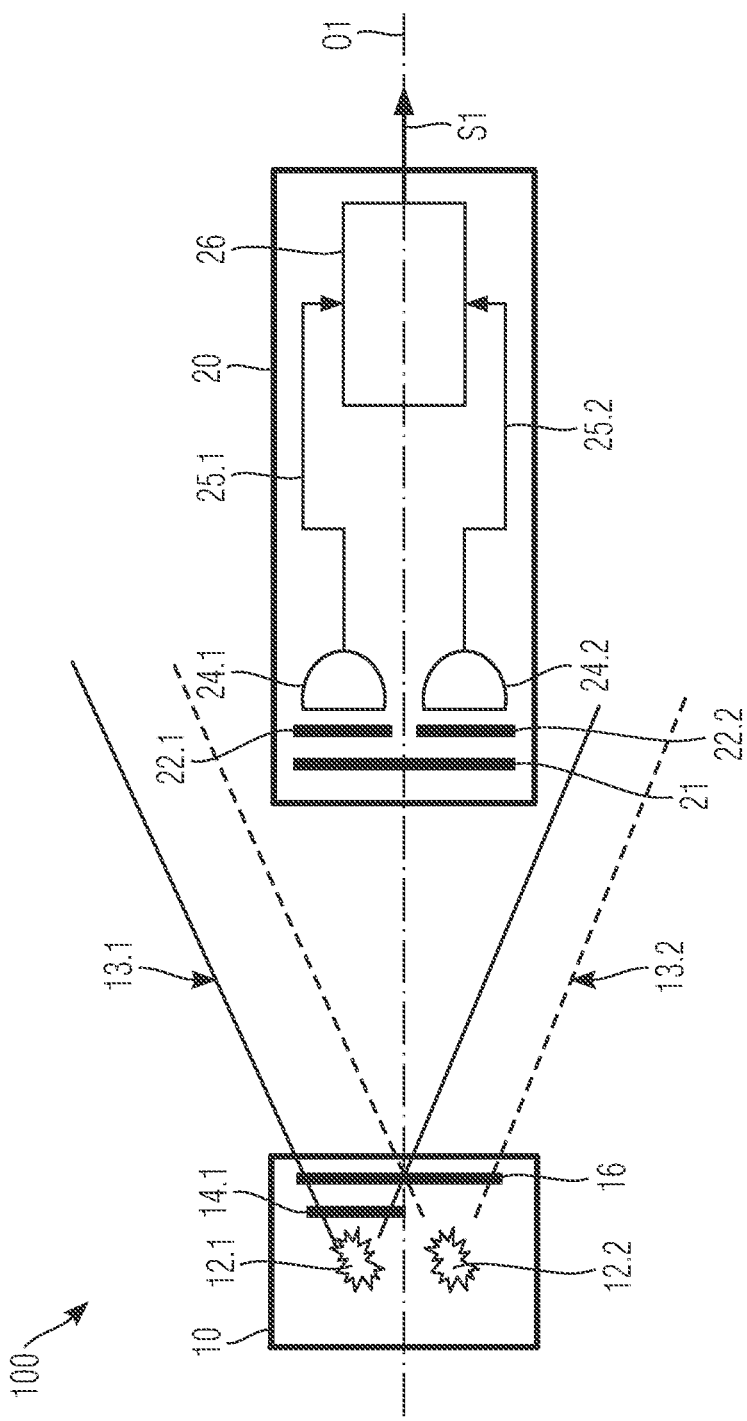

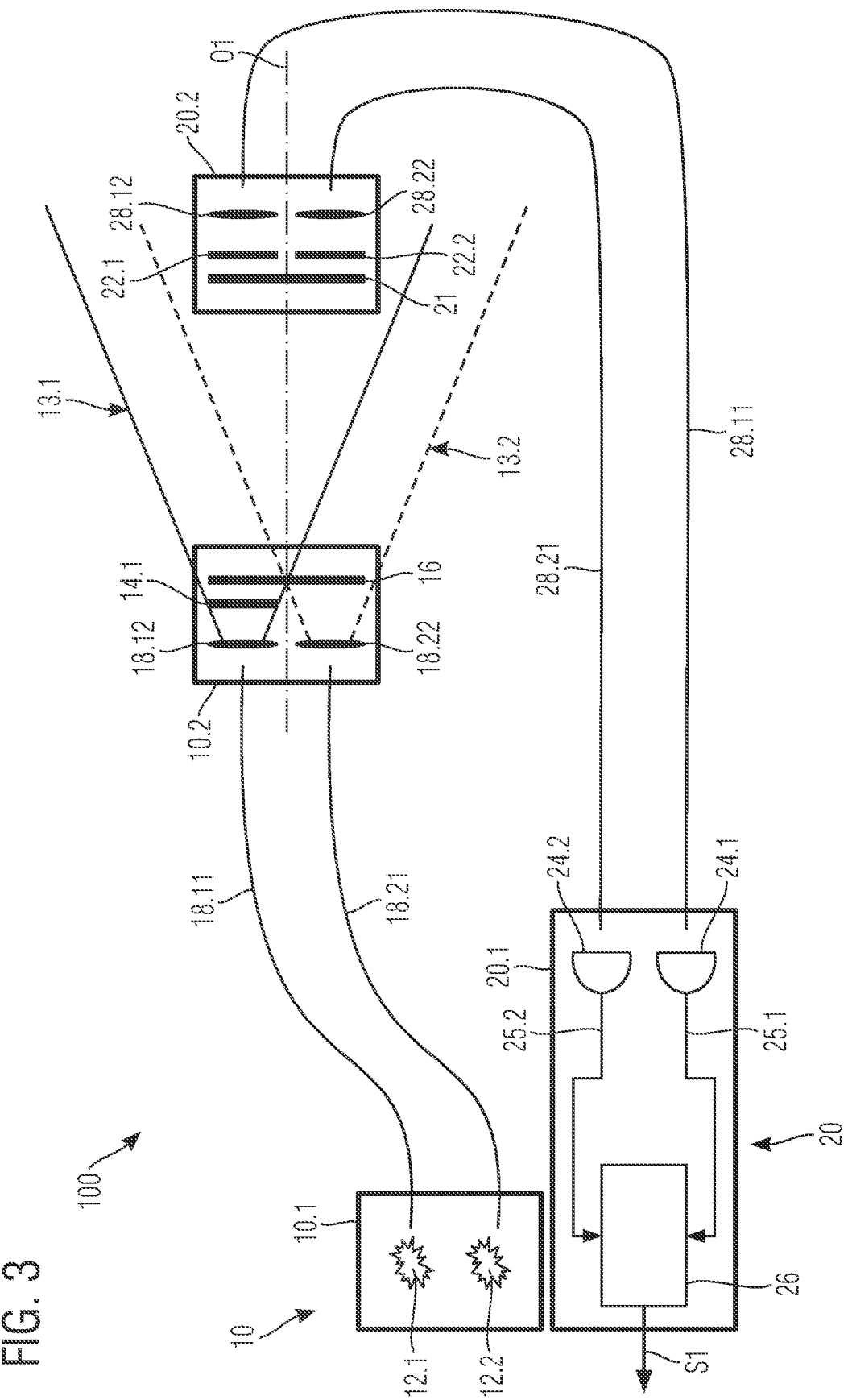

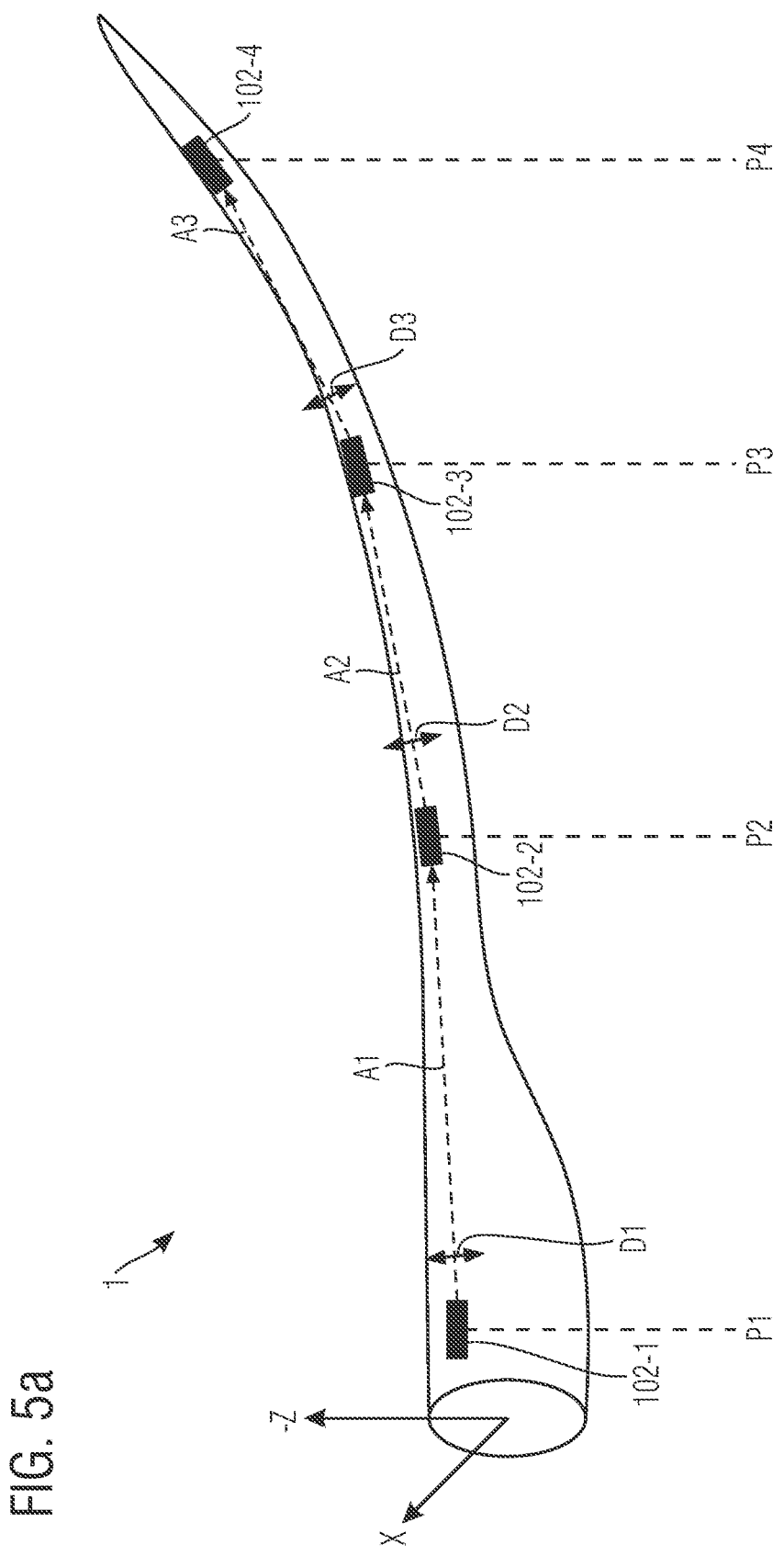

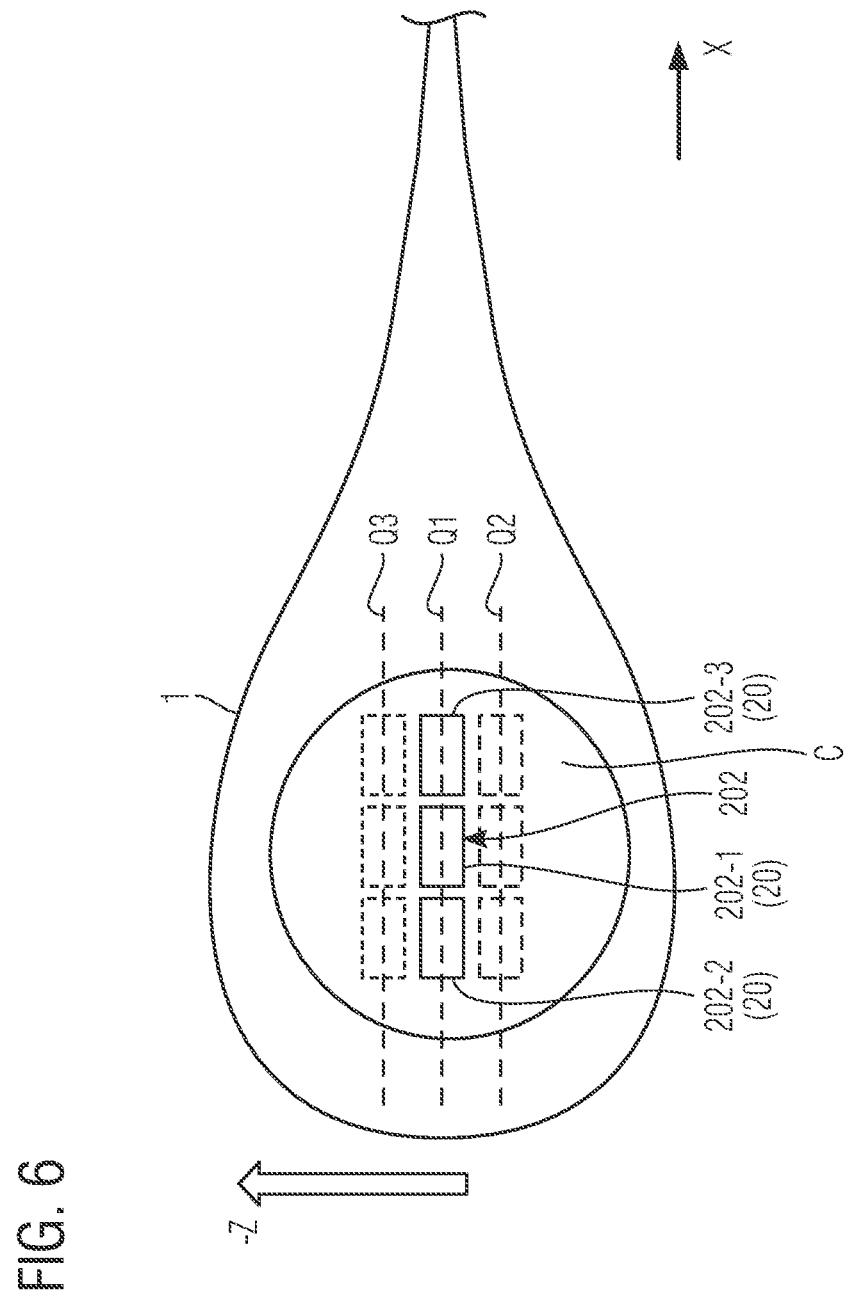

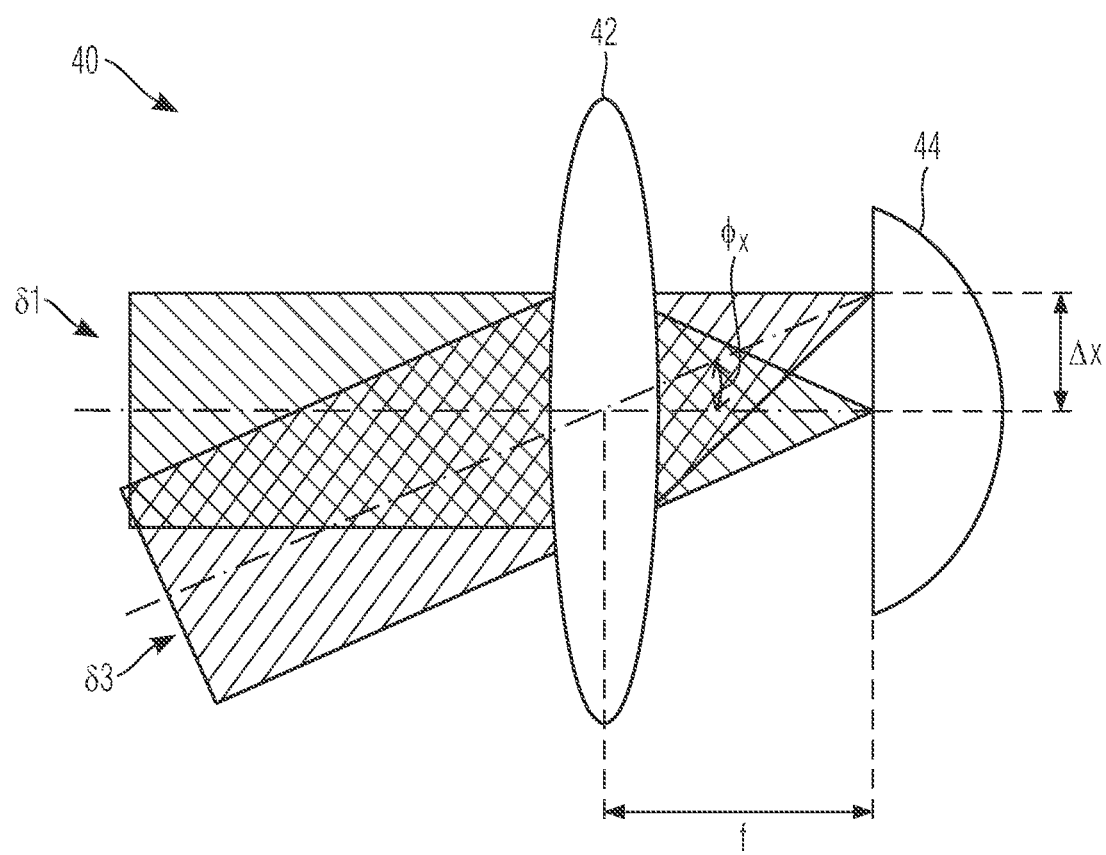

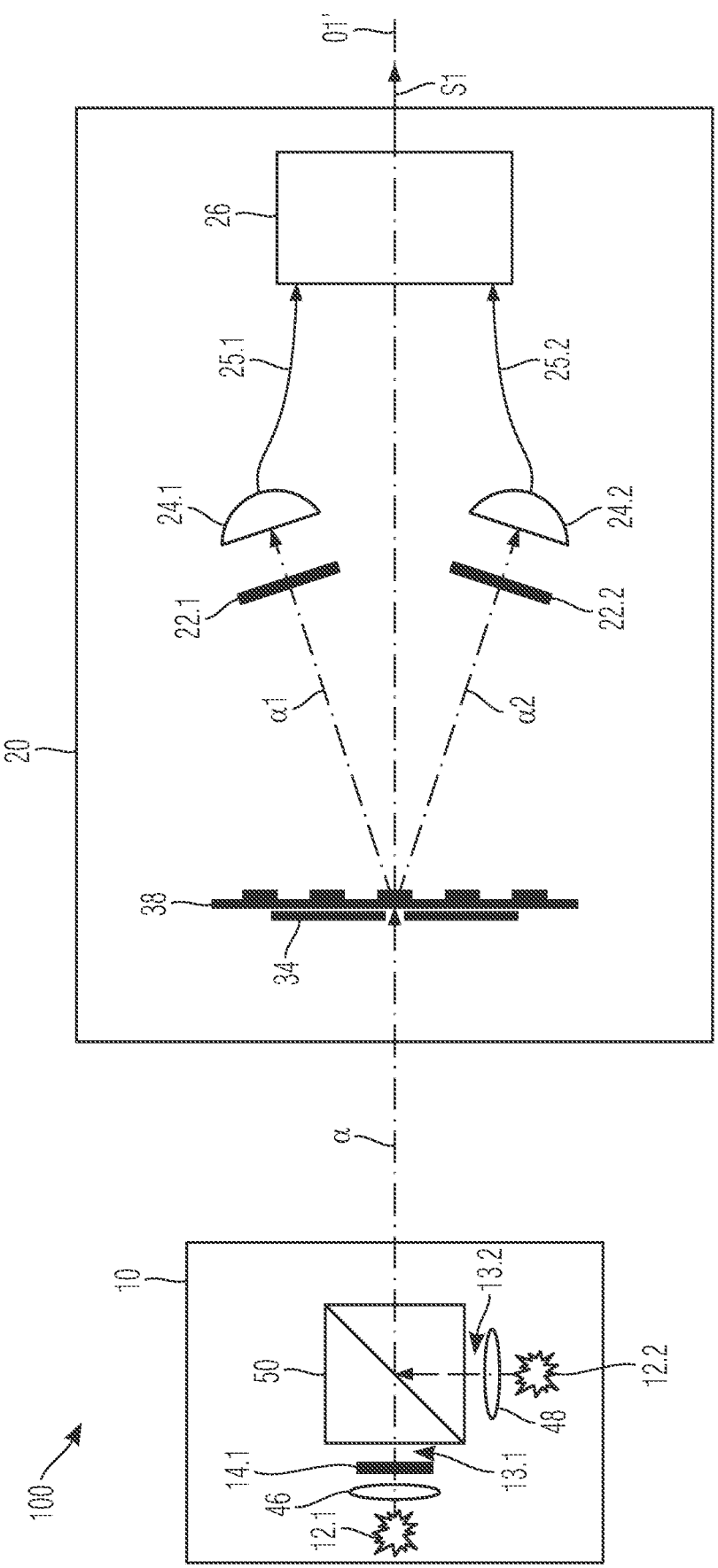

SENSOR ASSEMBLY FOR MEASURING AT LEAST A FIRST TORSION OF A ROTOR BLADE OF A WIND TURBINE GENERATOR SYSTEM

CROSS REFERENCE TO RELATED APPLICATION

This application claims benefit to German Patent Application No. DE 10 2021 213 938.8, filed on Dec. 8, 2021, which is hereby incorporated by reference herein.

FIELD

The present invention relates to a sensor assembly for measuring at least a first torsion of a rotor blade of a wind turbine generator system.

BACKGROUND

EP 3 467 463 A1 discloses a torsion sensor for determining a twisting moment acting on an object. The torsion sensor includes a radiation source and a radiation detector which are disposed on the object in spaced-apart relationship. The radiation source emits a beam of electromagnetic radiation toward the radiation detector. The radiation detector measures at least one quantity that is dependent on a region of incidence where the beam strikes the radiation detector. FIGS. 7 through 9 show an example which uses linearly polarized light, whose orientation is used for torsion measurement.

DE 10 2016 125 730 A1 discloses a sensor assembly of the above-mentioned type where torsion measurement is effected by measuring the rotation of a polarization. No free beam path is used. Instead, light is conducted through an optical fiber from a transmitter unit to a receiver unit.

Camera-based systems for torsion measurement are also known in the art. These systems are generally relatively susceptible to contamination and exhibit a relatively low measurement bandwidth.

SUMMARY

In an embodiment, the present invention provides a sensor assembly for measuring at least a first torsion of a rotor blade of a wind turbine generator system. A first light source is configured to generate light and a first transmitter-side polarizer is disposed downstream of the first light source in a direction of light propagation and configured to generate linearly polarized light as a first transmission light. A second light source is configured to generate unpolarized light as a second transmission light. A first detector element and a second detector element are arranged and adapted to receive the first transmission light and the second transmission light. A first receiver-side polarizer is disposed upstream of the first detector element in the direction of light propagation and a second receiver-side polarizer is disposed upstream of the second detector element in the direction of light propagation. An orientation of a polarization plane of the first receiver-side polarizer and an orientation of a polarization plane of the second receiver-side polarizer are different from one another.

BRIEF DESCRIPTION OF THE DRAWINGS

Subject matter of the present disclosure will be described in even greater detail below based on the exemplary figures. All features described and/or illustrated herein can be used alone or combined in different combinations. In the figures, like or functionally like elements are denoted by like reference numerals. The features and advantages of various embodiments will become apparent by reading the following detailed description with reference to the attached drawings, which illustrate the following:

FIG. 2 is a block diagram of an exemplary sensor assembly in accordance with a second exemplary embodiment;

FIG. 3 is a block diagram of an exemplary sensor assembly in accordance with a third exemplary embodiment;

FIG. 5a is a perspective view of an exemplary rotor blade having a transmitter unit and a plurality of transmitter/receiver units to form a metrology chain;

FIG. 5b is a block diagram of the transmitter unit and the transmitter/receiver units according to FIG. 5a;

FIG. 6 is a cross-sectional view of the rotor blade according to FIG. 5a in the region of a first line of sight, showing a plurality of receiver units arranged side-by-side in the X-direction;

FIG. 11 is a schematic view of a unit for measuring an angle, which may be employed in the sensor assembly according to FIG. 9 or 10;

FIG. 12 is a block diagram of an exemplary sensor assembly in accordance with a ninth exemplary embodiment;

FIG. 13b is a schematic side view of the beam path according to FIG. 13a.

DETAILED DESCRIPTION

Figure 1A:
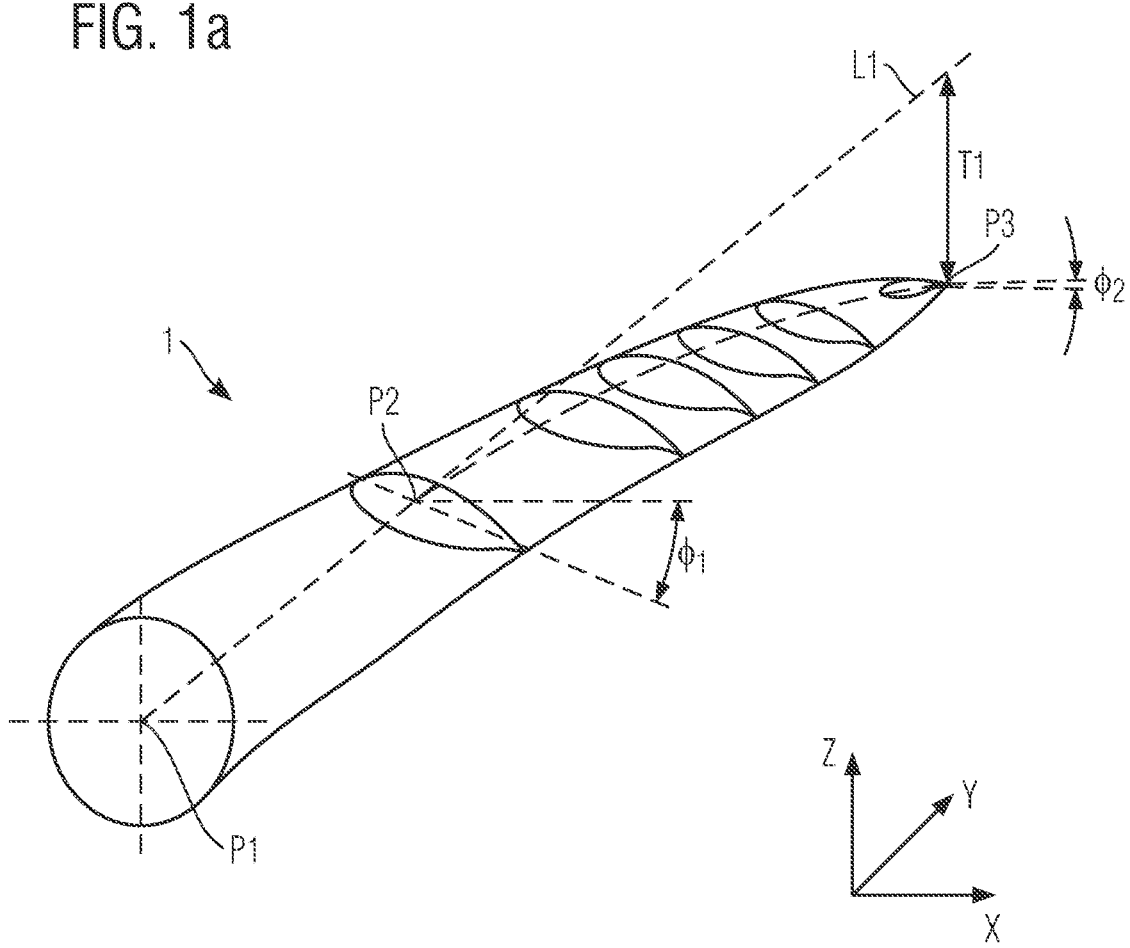
FIG. 1a is a perspective view of an exemplary rotor blade, illustrating a first and a second torsion of the rotor blade.

In an embodiment, the present invention provides a sensor assembly for measuring at least a first torsion of a rotor blade of a wind turbine generator system, which sensor assembly is simple and rugged in construction and enables accurate detection of the rotor blade.

The sensor assembly designed in accordance with an embodiment of the invention is used for measuring at least a first torsion of a rotor blade of a wind turbine generator system. The sensor assembly has a first light source for generating light and a first transmitter-side polarizer disposed behind the first light source in the direction of light propagation and used for generating linearly polarized light as a first transmission light. The sensor assembly has a first detector element and a second detector element. The first detector element and the second detector element are arranged and adapted to receive at least the first transmission light. The sensor assembly has a first receiver-side polarizer disposed in front of the first detector element in the direction of light propagation and a second receiver-side polarizer disposed in front of the second detector element in the direction of light propagation. An orientation of a polarization plane of the first receiver-side polarizer and an orientation of a polarization plane of the second receiver-side polarizer are different from one another. The sensor assembly has a second light source for generating unpolarized light as a second transmission light. The first detector element and the second detector element are arranged and adapted to receive the second transmission light.

Preferably, the first and second light sources are arranged side-by-side in a direction perpendicular to a longitudinal axis of the rotor blade.

Preferably, no transmitter-side polarizer is disposed between the second light source and a pair formed by the first and second detector elements. The second light source (i.e., the second transmission light in the form of unpolarized light), allows a first measurement signal generated by the first detector element and a second measurement signal generated by the second detector element to be compensated.

It is advantageous if the sensor assembly has first through third operating modes and if the sensor assembly is configured to switch cyclically between the first through third operating modes. This allows the aforementioned compensation to be performed repeatedly (continuously). This is advantageous particularly during long-term operation of the sensor assembly.

It is advantageous if in the first operating mode, the first and second light sources are switched off, if in the second operating mode, the first light source is switched off and the second light source is switched on, and if in the third operating mode, the first light source is switched on and the second light source is switched off. Preferably, in the first operating mode, a dark current measurement is made. Preferably, in the second operating mode, the aforementioned compensation is performed. In the third operating mode, the sensor assembly performs in particular the normal operation (torsion measurement).

It is advantageous if the sensor assembly has a transmitter unit disposed at a first position and a plurality of transmitter/receiver units disposed along a bending line of the rotor blade at second through nth positions (e.g., n=4), if the transmitter unit includes the first light source, the first transmitter-side polarizer, and the second light source, if a first transmitter/receiver unit of the transmitter/receiver units includes the first and second detector elements and the first and second receiver-side polarizers, if the first transmitter/receiver unit includes a third light source for generating light and a second transmitter-side polarizer disposed behind the third light source in the direction of light propagation, if the third light source and the second transmitter-side polarizer are configured to generate linearly polarized light as a third transmission light, and if the first transmitter/receiver unit includes a fourth light source for generating unpolarized light as a fourth transmission light. The transmitter unit and the transmitter/receiver units may form a measurement chain (metrology chain) for torsion measurement in a bent rotor blade. This advantageous particularly in the case of a rotor blade having a factory-predetermined curvature (known as pre-bend).

It is also advantageous if the first light source and the first transmitter-side polarizer are configured to generate the linearly polarized light as the first transmission light in such a manner that a polarization direction of the linearly polarized light is parallel or perpendicular to a second direction, and if the second direction is defined by a predetermined curvature of the rotor blade. This makes it possible to reduce or minimize measurement errors caused by the projection of the polarization state (or the polarization direction) onto the first and second receiver-side polarizers, which, for example, are tilted under no-load conditions by the predetermined curvature of the rotor blade.

Preferably, the first and second light sources are arranged relative to each other in such a way that they radiate substantially into the same solid angle.

For example, the first and/or second light sources are each an incoherent light source, preferably an LED or a laser.

The first light source may also be referred to as measurement light source, and the second light source may also be referred to as compensating light source.

Using embodiments of the invention, at least a first torsion of the rotor blade defined relative to a first position and a second position can be detected with a sensor assembly that is simple and rugged in construction. The detection is accomplished substantially independently of changes in environmental conditions (e.g., variations in temperature and/or moisture) and independently of the weather (e.g., mist). In this way, high-accuracy detection of the rotor blade is achieved, particularly during long-term operation of the sensor assembly. Embodiments of the invention further allow the first torsion and/or other torsions to be detected with a relatively high bandwidth (e.g., on the order of several kHz). This enables in particular fluttering movements of the rotor blade to be reliably detected or measured. Moreover, it is possible to detect the first torsion and/or other torsions under different load conditions (e.g., different degrees of bending of the rotor blade in the positive or negative Z-direction). This may be done in particular using a metrology chain arranged in the rotor blade.

Other details and advantages of embodiments of the present invention will become apparent from the following description of exemplary embodiments of the invention in conjunction with the figures.

FIG. 1a shows, in a perspective view, an exemplary rotor blade 1 to illustrate a first and a second torsion $\phi_1$, $\phi_2$ of rotor blade 1. Rotor blade 1 has a longitudinal axis L1. First torsion $\phi_1$ is defined relative to a first position P1 and a second position P2. Second torsion $\phi_2$ is defined relative to second position P2 and a third position P3. First through third positions P1 through P3 are disposed in spaced-apart relationship along the longitudinal extent of rotor blade 1.

As shown in FIG. 1a, rotor blade 1 has a predetermined curvature T1 (pre-bend). Predetermined curvature T1 is defined relative to longitudinal axis L1. For example, predetermined curvature T1 extends in the negative Z-direction (see FIG. 1a).

A first direction (X-direction) or a coordinate axis X is perpendicular to longitudinal axis L1. A second direction (Z-direction) or a coordinate axis Z is defined by predetermined curvature T1 of rotor blade 1. A third direction (Y-direction) or a coordinate axis Y is parallel to longitudinal axis L1. The first through third directions (coordinate axes X, Z, Y) define the coordinate system shown in FIG. 1a.

First position P1 corresponds, for example, to a position at or near a blade root of rotor blade 1. Third position P3 corresponds, for example, to a position at or near a blade tip of rotor blade 1. Second position P2 corresponds, for example, to a position inside rotor blade 1. Second position P2 is disposed, for example, between first and third positions P1, P3.

First through fourth exemplary embodiments will now be described with reference to FIGS. 1B and 2 through 4. The sensor assembly according to the first through fourth exemplary embodiments in each case serves to measure first torsion $\phi_1$ (see FIG. 1a).

The sensor assembly according to the first exemplary embodiment includes a first light source 12.1 for generating light and a first transmitter-side polarizer 14.1 disposed behind first light source 12.1 in the direction of light propagation and used for generating linearly polarized light as a first transmission light 13.1. First transmission light 13.1 has a radiation pattern corresponding to a predetermined solid angle (see FIG. 1B).

Figure 1B:
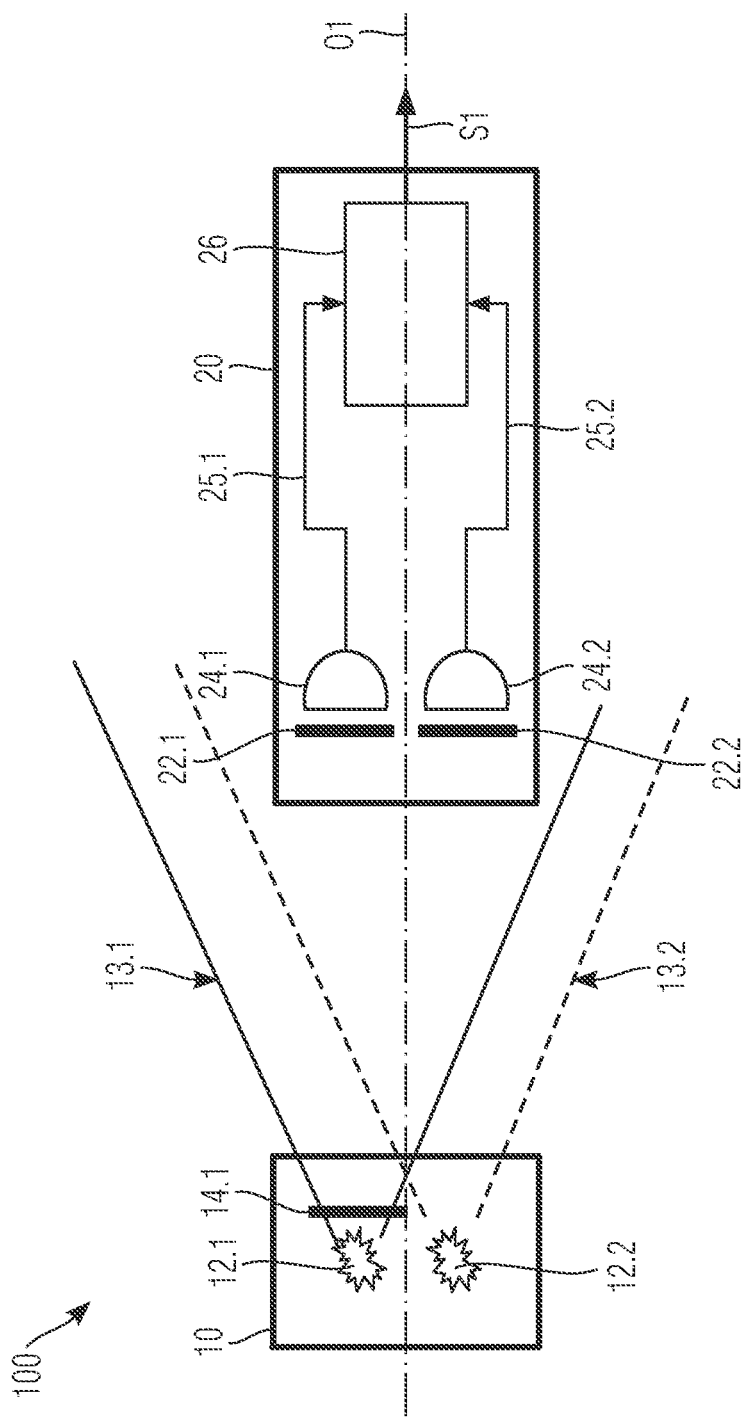
FIG. 1B is a block diagram of an exemplary sensor assembly in accordance with a first exemplary embodiment.

The sensor assembly according to FIG. 1B includes a first detector element 24.1 and a second detector element 24.2. First detector element 24.1 and second detector element 24.2 are arranged and adapted to receive at least first transmission light 13.1. As shown in FIG. 1B, first and second detector elements 24.1, 24.2 are disposed side-by-side in a plane perpendicular to an optical axis O1 (i.e., an X-Z plane). Preferably, optical axis O1 is parallel to longitudinal axis L1.

The sensor assembly according to FIG. 1B includes a first receiver-side polarizer 22.1 disposed in front of first detector element 24.1 in the direction of light propagation and a second receiver-side polarizer 22.2 disposed in front of second detector element 24.2 in the direction of light propagation. An orientation of a polarization plane of first receiver-side polarizer 22.1 and an orientation of a polarization plane of second receiver-side polarizer 22.2 are different from one another.

First transmitter-side polarizer 14.1 and first and second receiver-side polarizers 22.1, 22.2 may also be referred to as linear polarizers. Preferably, the orientation of the polarization plane of first receiver-side polarizer 22.1 and the orientation of the polarization plane of second receiver-side polarizer 22.2 are perpendicular (at an angle of 90°) to each other.

The sensor assembly according to FIG. 1B has a second light source 12.2 for generating unpolarized light as a second transmission light 13.2. Second transmission light 13.2 has a radiation pattern corresponding to a predetermined solid angle (see FIG. 1B again). As shown in FIG. 1B, first and second light sources 12.1, 12.2 are disposed side-by-side in a direction perpendicular to optical axis O1 (i.e., in the X-direction).

First and second light sources 12.1, 12.2 are arranged relative to each other in such a way that they radiate substantially into the same solid angle. In other words, the solid angles of the radiation patterns of first and second light sources 12.1, 12.2 substantially coincide with each other.

Referring to FIG. 1B, first and second light sources 12.1, 12.2 have optical axis O1 as a common (substantially the same) optical axis.

As shown in FIG. 1B, first detector element 24.1 and second detector element 24.2 are arranged and adapted to receive second transmission light 13.2. FIG. 1B further shows that no transmitter-side polarizer is disposed between second light source 12.2 and a pair formed by first and second detector elements 24.1, 24.2. In other words, first polarizer 14.1 is disposed only between first light source 12.1 and the pair formed by first and second detector elements 24.1, 24.2. Thus, the pair formed by first and second detector elements 24.1, 24.2 serves, on the one hand, to receive first transmission light 13.1 in the form of linearly polarized light and, on the other hand, to receive second transmission light 13.2 in the form of unpolarized light.

Referring to FIG. 1B, the sensor assembly has an analysis unit 26 for generating an output signal S1 representative of a measure of first torsion $\phi_1$ as a function of a first measurement signal 25.1 generated by first detector element 24.1 and as a function of a second measurement signal 25.2 generated by second detector element 24.2.

Analysis unit 26 calculates, for example, a quotient from the difference and the sum of first and second measurement signals 25.1, 25.2.

In the first exemplary embodiment, a transmitter unit 10 is formed by first and second light sources 12.1, 12.2 and first transmitter-side polarizer 14.1. Furthermore, in the first exemplary embodiment, a receiver unit 20 is formed by first and second detector elements 24.1, 24.2, first and second receiver-side polarizers 22.1, 22.2, and analysis unit 26. Transmitter unit 10 and receiver unit 20 in turn form the system 100 shown in FIG. 1B.

The sensor assembly according to the second exemplary embodiment differs from the sensor assembly according to the first exemplary embodiment in that the sensor assembly has a transmitter-side color filter 16 disposed behind first light source 12.1 in the direction of light propagation and a receiver-side color filter 21 disposed in front of first and second detector elements 24.1, 24.2 in the direction of light propagation. A pass-wavelength of transmitter-side color filter 16 and a pass-wavelength of receiver-side color filter 21 are the same. In particular, transmitter-side color filter 16 is associated with both first and second light sources 12.1, 12.2 (see FIG. 2).

In the second exemplary embodiment, a transmitter unit 10 is formed by elements 12.1, 12.2, 14.1 and 16. Furthermore, in the second exemplary embodiment, a receiver unit 20 is formed by elements 24.1, 24.2, 22.1, 22.2, 21 and 26. Transmitter unit 10 and receiver unit 20 in turn form the system 100 shown in FIG. 2.

Transmitter unit 10 and receiver unit 20 of the system 100 according to FIG. 2 are matched to each other by transmitter-side color filter 16 and receiver-side color filter 21. That is, receiver unit 20 is only sensitive to first and second transmission lights 13.1, 13.2 of a wavelength predetermined by transmitter unit 10 (i.e., transmitter-side color filter 16). On the other hand, receiver unit 20 is not sensitive to transmission light having another wavelength and being different from the first and second transmission lights 13.1, 13.2 having the predetermined wavelength.

As an alternative to the second exemplary embodiment, the sensor assembly according to FIG. 1B may be configured to modulate each of the first and/or second light source(s) 12.1, 12.2 with a predetermined frequency to generate the first and/or second transmission light(s) 13.1, 13.2 as a modulated transmission light in order to obtain a first modulated measurement signal 25.1 generated by first detector element 24.1 and a second modulated measurement signal 25.2 generated by second detector element 24.2. In this case, analysis unit 26 is configured to generate output signal S1 as a function of first and second modulated measurement signals 25.1, 25.2.

By means of the aforementioned modulation, it is achieved that transmitter unit 10 and receiver unit 20 of the system 100 according to FIG. 1B are matched to each other. That is, receiver unit 20 is only sensitive to first and second transmission lights 13.1, 13.2 of a frequency predetermined by transmitter unit 10 (i.e., by the modulation of first and/or second light source(s) 12.1, 12.2). On the other hand, receiver unit 20 is not sensitive to transmission light having another frequency and being different from the first and second transmission lights 13.1, 13.2 having the predetermined frequency.

The sensor assembly according to the third exemplary embodiment differs from the sensor assembly according to the second exemplary embodiment by the following structural features: The sensor assembly has a first transmitter-side optical waveguide 18.11 coupled to first light source 12.1 and a second transmitter-side optical waveguide 18.21 coupled to second light source 12.2. The sensor assembly has a first transmitter-side lens element 18.12 coupled to first transmitter-side optical waveguide 18.11 and a second transmitter-side lens element 18.22 coupled to second transmitter-side optical waveguide 18.21. The sensor assembly has a first receiver-side optical waveguide 28.11 coupled to first detector element 24.1 and a second receiver-side optical waveguide 28.21 coupled to second detector element 24.2. The sensor assembly has a first receiver-side lens element 28.12 coupled to first receiver-side optical waveguide 28.11 and a second receiver-side lens element 28.22 coupled to second receiver-side optical waveguide 28.21. First and second transmitter-side lens elements 18.12, 18.22 and first and second receiver-side lens elements 28.12, 28.22 are each disposed within a longitudinally extending portion of rotor blade 1. Furthermore, first and second light sources 12.1, 12.2 and first and second detector elements 24.1, 24.2 are each disposed outside the longitudinally extending portion of rotor blade 1 (e.g., in or near the blade root or outside the entire rotor blade 1).

It is thereby achieved that the (purely) optical elements (particularly elements 18.12, 18.22, 28.12, 28.22) are decoupled (or separated) from the elements having active electronics (particularly elements 12.1, 12.2, 24.1, 24.2). This is advantageous in that the elements having active electronics can be prevented from damage or failure due to, for example, lightning discharge into the wind turbine generator system.

Elements 12.1, 12.2 form a first portion 10.1 of a transmitter unit 10. Elements 18.12, 18.22, 14.1, 16 form a second portion 10.2 of transmitter unit 10. Elements 24.1, 24.2, 26 form a first portion 20.1 of a receiver unit 20. Elements 28.12, 28.22, 22.1, 22.2, 21 form a second portion 20.2 of receiver unit 20. Transmitter unit 10 and receiver unit 20 in turn form the system 100 shown in FIG. 3.

First and second transmitter-side optical waveguides 18.11, 18.21 are each multi-mode fibers or single-mode fibers, and first and second receiver-side optical waveguides 28.11, 28.21 are each multi-mode fibers. The multi-mode fibers are in particular fibers having a large core and a matched numerical aperture. The sensor assembly according to FIG. 3 is in particular a passive measurement configuration.

The sensor assembly according to the fourth exemplary embodiment differs from the sensor assembly according to the second exemplary embodiment by the following structural features: The sensor assembly has a retroreflector 30 disposed behind first light source 12.1 in the direction of light propagation and fixedly connected with first transmitter-side polarizer 14.1. First light source 12.1, first detector element 24.1, and second detector element 24.2 are arranged side-by-side in the first direction (X-direction) perpendicular to longitudinal axis L1 of rotor blade 1. Second light source 12.2 is disposed between a pair formed by first and second detector elements 24.1, 24.2 and retroreflector 30 (see FIG. 4).

Figure 4:
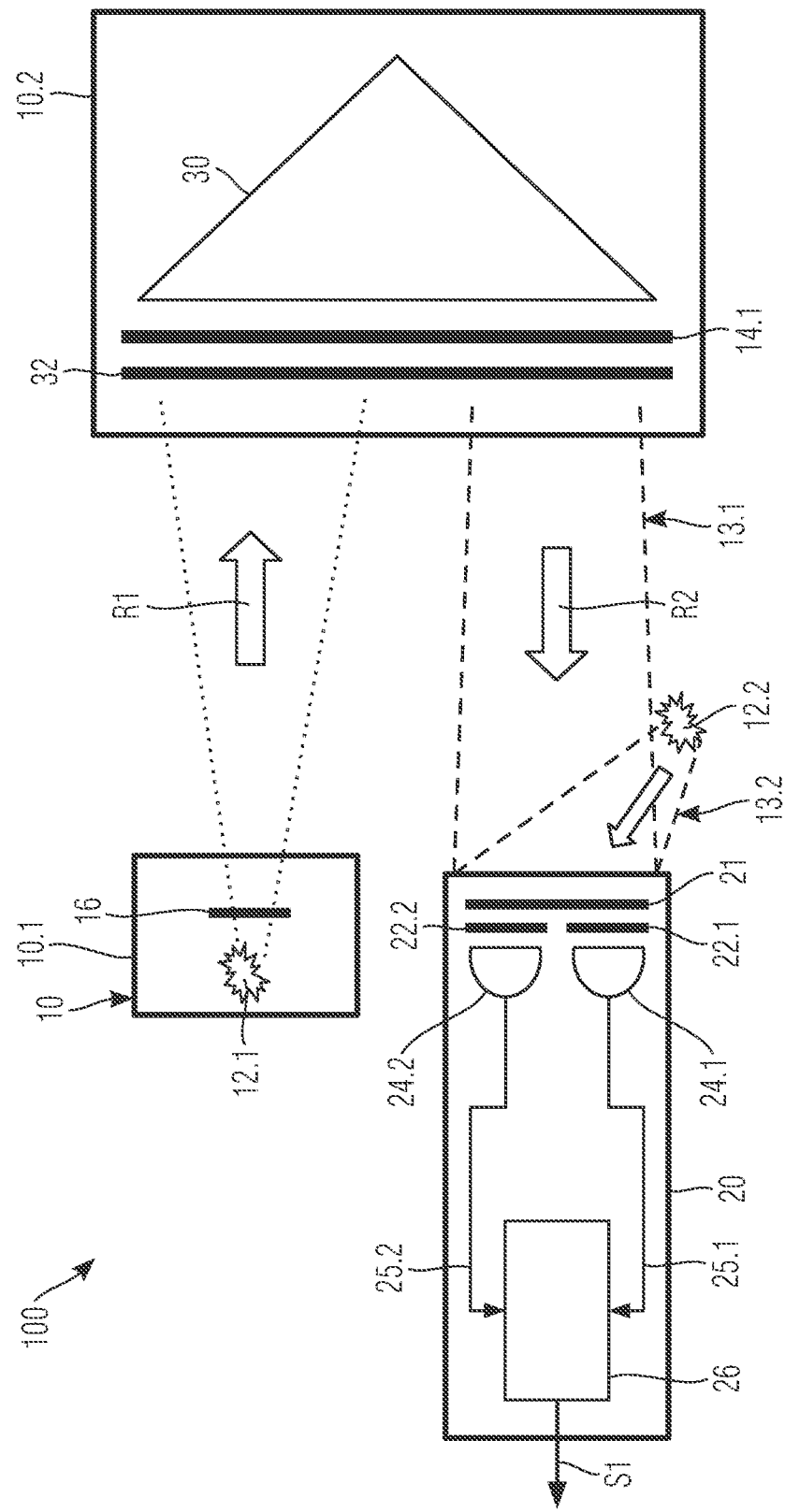
FIG. 4 is a block diagram of an exemplary sensor assembly in accordance with a fourth exemplary embodiment.

In FIG. 4, two arrows R1, R2 are shown. Arrow R1 indicates the direction of light propagation from first light source 12.1 to retroreflector 30. Arrow R2 indicates the direction of light propagation from retroreflector 30 to the pair formed by first and second detector elements 24.1, 24.2. As illustrated in FIG. 4, second light source 12.2 is disposed behind retroreflector 30 in the direction of light propagation (arrow R2). FIG. 4 further shows that second transmission light 13.2 of second light source 12.2 (together with first transmission light 13.1) impinges on the pair formed by first and second detector elements 24.1, 24.2.

Referring to FIG. 4, an additional color filter 32 is provided in addition to transmitter-side color filter 16 and receiver-side color filter 21. Additional color filter 32 is disposed, on the one hand, between first light source 12.1 and retroreflector 30 and, on the one hand, between the pair formed by first and second detector elements 24.1, 24.2 and retroreflector 30. Retroreflector 30 serves to deflect the direction of light propagation, as indicated by arrows R1, R2.

Elements 12.1, 16 form a first portion 10.1 of a transmitter unit 10. Elements 14.1, 30, 32 form a second portion 10.2 of transmitter unit 10. Elements 24.1, 24.2, 22.1, 22.2, 21, 26 form a receiver unit 20. Transmitter unit 10 and receiver unit 20 in turn form the system 100 shown in FIG. 4.

In the fourth exemplary embodiment, a particularly compact design is achieved for the sensor assembly. In particular, retroreflector 30 may be disposed in the blade tip of rotor blade 1.

When rotor blade 1 is subjected to torsion, retroreflector 30 and first transmitter-side polarizer 14.1 rotate together, whereby the polarization direction of the reflected light (i.e., first transmission light 13.1) rotates as well. This polarization rotation is detected by receiver unit 20.

It is conceivable to arrange a plurality of retroreflectors in the field of view of first portion 10.1 of transmitter unit 10 and to provide a plurality of receiver units associated with the respective retroreflectors. In this context, provision may be made for a plurality of transmitter-side color filters associated with the respective retroreflectors and for a plurality of receiver-side color filters associated with the respective receiver units. These transmitter-side color filters and these receiver-side color filters are in particular matched to each other. In other words, for each color-coded retroreflector, there is now one receiver unit coded in the same color. In this case, to be able to determine linearity constants of detector elements of the respective receiver unit (see also the later explanations on the exemplary operation of the sensor assembly), second light source 12.2 is disposed on or near the respective receiver unit in such a way that second light source 12.2 illuminates first and second detector elements 24.1, 24.2 with the same optical power.

The operation of the sensor assembly is described hereinafter. The sensor assembly has first through third operating modes. The sensor assembly is configured to switch cyclically between the first through third operating modes.

The operating modes are defined as follows (see FIG. 1B): In the first operating mode, first and second light sources 12.1, 12.2 are switched off. In the second operating mode, first light source 12.1 is switched off and second light source 12.2 is switched on. In the third operating mode, first light source 12.1 is switched on and second light source 12.2 is switched off. The third operating mode may also be referred to as measurement mode. The second operating mode may also be referred to as compensation mode. In the first operating mode, in particular, a dark current measurement is made.

The previously described cyclic switching, in particular during long-term operation, allows compensation of the sensor assembly (i.e., of first and second detector elements 24.1, 24.2) to be performed repeatedly (continuously). In this way, high accuracy is achieved for the detection of rotor blade 1, in particular when environmental conditions change during long-term operation. There occurs a virtually continuous compensation of the sensor assembly (online signal compensation).

Figure 5B:
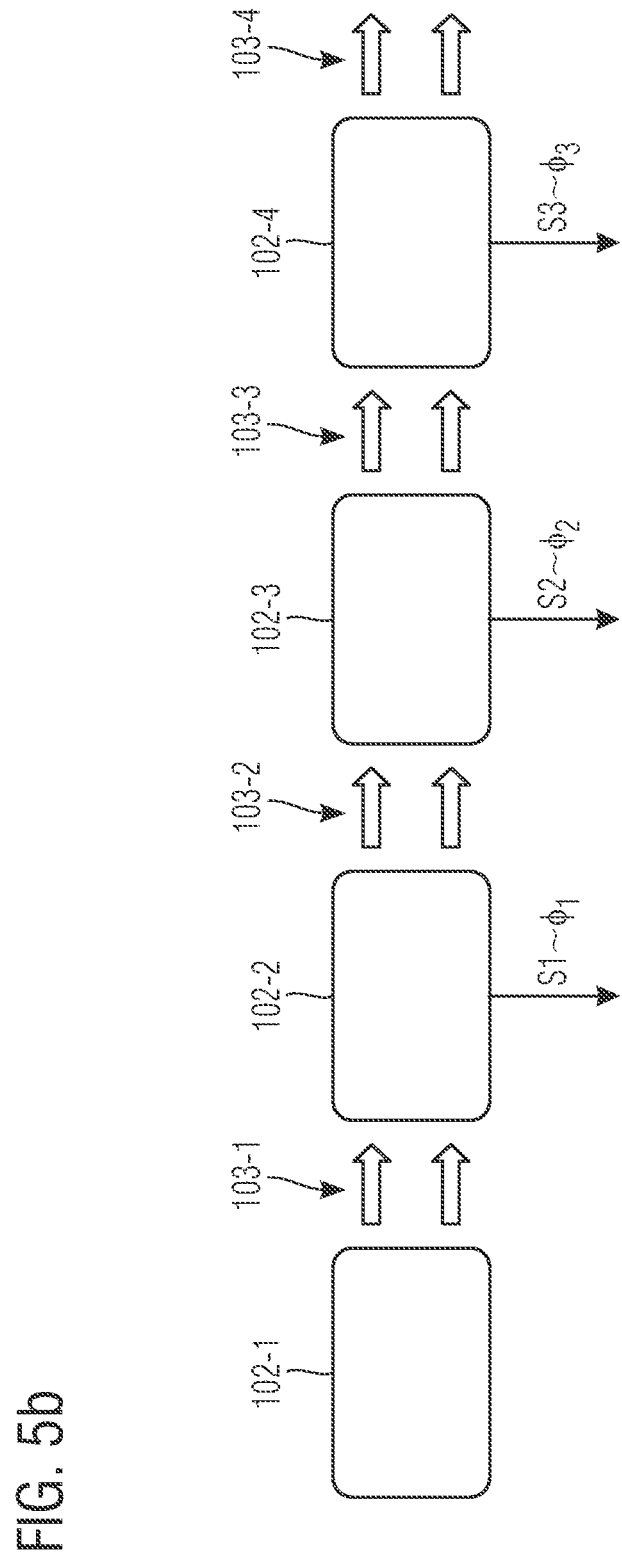

FIGS. 5a through 5d show details of a metrology chain. As can be seen in FIG. 5a, the metrology chain is provided in a curved rotor blade 1.

FIG. 5a shows four different positions P1 through P4 (i.e., n=4). First position P1 in FIG. 5a corresponds in particular to first position P1 in FIG. 1a. Second through fourth positions P2 through P4 in FIG. 5a correspond to a plurality of positions disposed along a longitudinal extent of rotor blade 1. First and second positions P1, P2 are spaced apart by a first distance (first line of sight A1). Second and third positions P2, P3 are spaced apart by a second distance (second line of sight A2). Third and fourth positions P3, P4 are spaced apart by a third distance (third line of sight A3). First through third lines of sight A1 through A3 form a curve. This curve corresponds substantially to a bending line of rotor blade 1. As shown by way of example in FIG. 5a, rotor blade 1 is curved in the negative Z-direction.

Figure 5C:
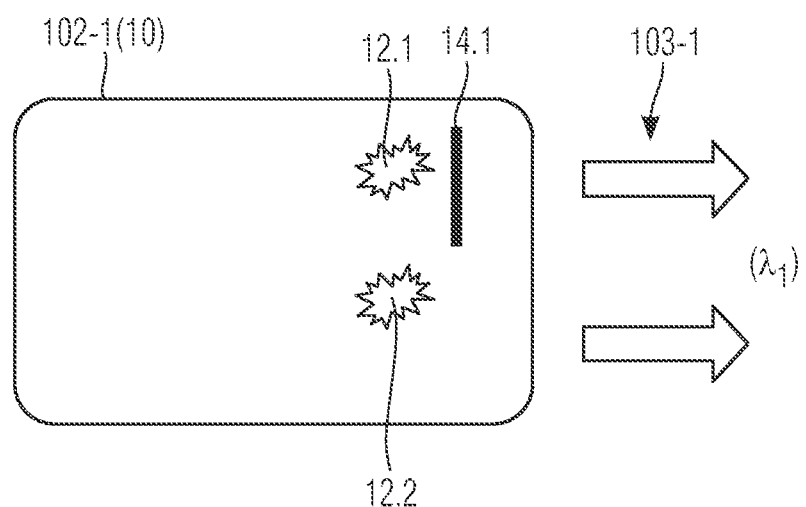
FIG. 5c is a block diagram of the transmitter unit according to FIG. 5b.
Figure 5D:
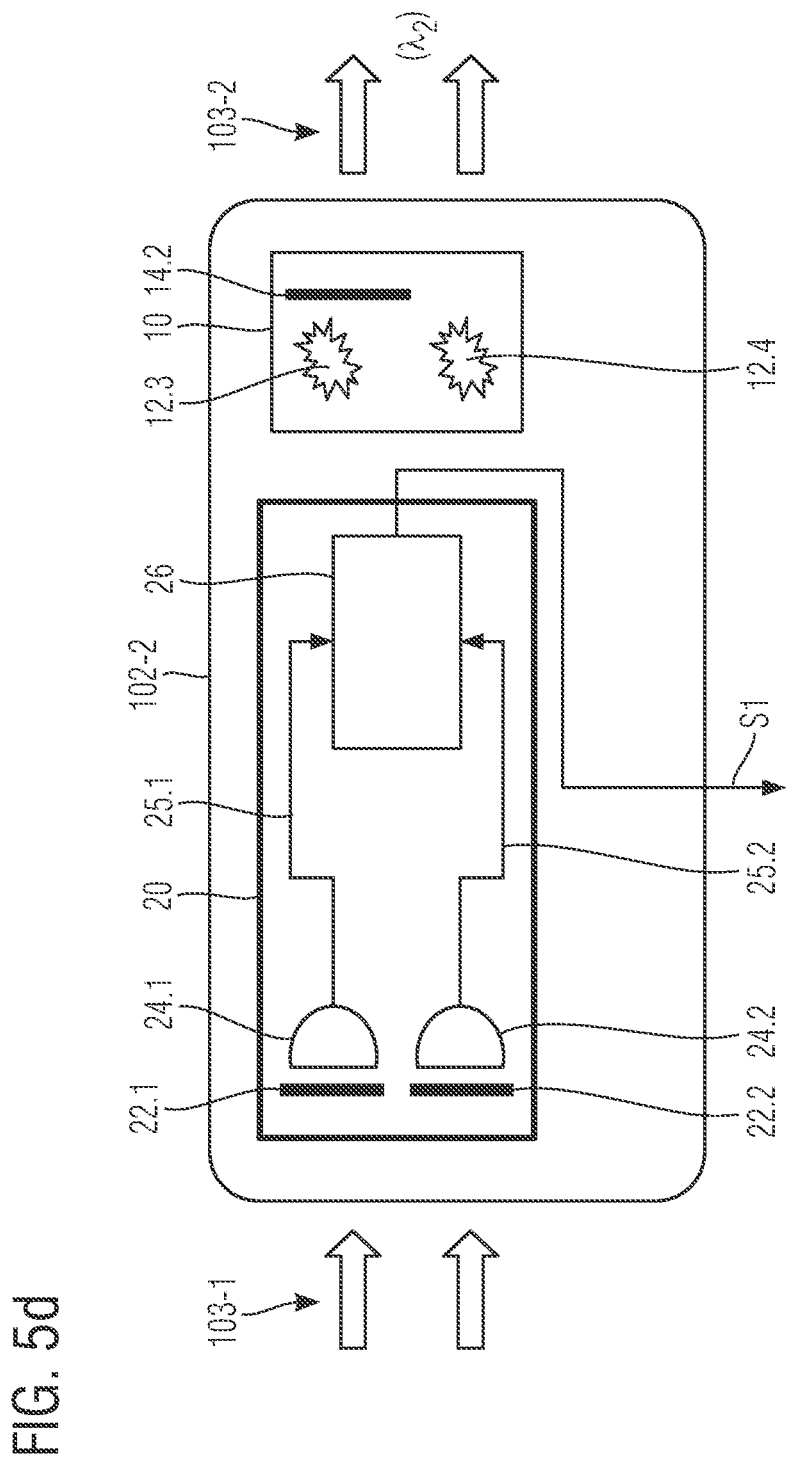
FIG. 5d is a block diagram of a first transmitter/receiver unit of the transmitter/receiver units according to FIG. 5b.

In the exemplary embodiment according to FIG. 5a, the sensor assembly has a transmitter unit 102-1 disposed at first position P1 and a plurality of transmitter/receiver units 102-2, 102-3, 102-4 disposed at second through fourth positions P2 through P4. The metrology chain formed by transmitter unit 102-1 and transmitter/receiver units 102-2, 102-3, 102-4 is schematically indicated in FIG. 5b. Referring to FIG. 5c, transmitter unit 102-1 includes first light source 12.1, first transmitter-side polarizer 14.1, and second light source 12.2. Referring to FIG. 5d, a first transmitter/receiver unit 102-2 of transmitter/receiver units 102-2 through 102-4 includes first and second detector elements 24.1, 24.2 and first and second receiver-side polarizers 22.1, 22.2. As can be seen in FIG. 5d, first transmitter/receiver unit 102-2 further includes a third light source 12.3 for generating light and a second transmitter-side polarizer 14.2 disposed behind third light source 12.3 in the direction of light propagation. Third light source 12.3 and second transmitter-side polarizer 14.2 are configured to generate linearly polarized light as a third transmission light. It can also be seen in FIG. 5d that first transmitter/receiver unit 102-2 includes a fourth light source 12.4 for generating unpolarized light as a fourth transmission light.

Transmitter unit 102-1 in FIG. 5c corresponds in particular to transmitter unit 10 in FIG. 1B. Receiver unit 20 of first transmitter/receiver unit 102-2 in FIG. 5d corresponds in particular to receiver unit 20 in FIG. 1B. Elements 12.3, 12.4 and 14.2 in FIG. 5d form an additional transmitter unit 10. Receiver unit 20 in FIG. 5d forms part of first transmitter/receiver unit 102-2. The additional transmitter unit 10 in FIG. 5d also forms part of first transmitter/receiver unit 102-2.

Second and third transmitter/receiver units 102-3, 102-4 of transmitter/receiver units 102-2 through 102-4 are each designed analogously to first transmitter/receiver unit 102-2. First transmitter/receiver unit 102-2 serves to generate the output signal S1 representative of the measure of first torsion $\phi_1$ (see FIG. 5b). Second and third transmitter/receiver units 102-3, 102-4 serve to generate an output signal S2, S3 representative of a measure of a second and a third torsion $\phi_2$, $\phi_3$, respectively (see FIG. 5b).

By means of the previously described metrology chain, a torsion measurement over a plurality of positions (e.g., positions P1 through P4) disposed along the bending line of rotor blade 1 is achieved.

In this torsion measurement, it is advantages if first light source 12.1 and first transmitter-side polarizer 14.1 are configured to generate the linearly polarized light as the first transmission light 13.1 in such a way that a polarization direction of the linearly polarized light is parallel or perpendicular to second direction Z. In FIG. 5a, this is illustrated for first line of sight A1 by double-headed arrow D1. This applies analogously to second and third lines of sight A2, A3 in FIG. 5a (double-headed arrows D2, D3).

First and second transmission lights 13.1, 13.2 (see FIG. 1B) create a first total transmission light 103-1 (see FIG. 5c). The third and fourth transmission lights create a second total transmission light 103-2 (see FIG. 5d). Referring to FIG. 5b, transmitter unit 102-1 and first through third transmitter/receiver units 102-2 through 102-4 may also be referred to as metrology blocks. As schematically indicated in FIG. 5b, first total transmission light 103-1 is transmitted between metrology blocks 102-1, 102-2. FIG. 5b also schematically shows that second total transmission light 103-2 is transmitted between metrology blocks 102-2, 102-3. This applies analogously to the transmission (or emission) of third and fourth total transmission lights 103-3, 103-4 (see FIG. 5b).

Referring to FIG. 5c, transmitter unit 102-1 may be configured such that first and second transmission lights 13.1, 13.2 (i.e., first total transmission light 103-1) are generated with a predetermined first wavelength $\lambda_1$. Referring to FIG. 5d, first transmitter/receiver unit 102-2 may be configured such that the third and fourth transmission lights (i.e., second total transmission light 103-2) are generated with a predetermined second wavelength $\lambda_2$. Advantageously, predetermined first wavelength $\lambda_1$ and predetermined second wavelength $\lambda_2$ are different from each other.

To produce the predetermined first and second wavelengths $\lambda_1$, $\lambda_2$, suitable transmitter-side color filters may be disposed behind first and second light sources 12.1, 12.2 in the direction of light propagation and behind third and fourth light sources 12.3, 12.4 in the direction of light propagation, respectively (not shown in FIGS. 5c and 5d).

Third and fourth total transmission lights 103-3, 103-4 having respective predetermined third and fourth wavelengths can be generated in an analogous manner. Thus, referring to FIG. 5b, first through fourth total transmission lights 103-1 through 103-4 are transmitted (or emitted) with respective predetermined different wavelengths (adjacent metrology blocks being respectively wavelength-selectively matched to each other). In this manner, it is achieved that metrology block 102-2 is only sensitive to first total transmission light 103-1 of metrology block 102-1, that metrology block 102-3 is only sensitive to second total transmission light 103-2 of metrology block 102-2, etc.

The above-mentioned use of respective predetermined different wavelengths for the metrology chain is advantageous, for example, when the current flow of wind onto the wind turbine generator system is such that rotor blade 1 is substantially straight and the pre-bend (see reference numeral T1 in FIG. 1a) is fully compensated for (i.e., disappears). In this case, it can happen that, for example, metrology block 102-3 receives both first total transmission light 103-1 of metrology block 102-1 and second total transmission light 103-2 of metrology block 102-2.

FIG. 6 is an exemplary cross-sectional view of the rotor blade 1 according to FIG. 5a in the region of first line of sight A1, showing a plurality of receiver units 202 arranged side-by-side in the X-direction and one behind the other in the Y-direction. Receiver units 202 include first through third receiver units 202-1 through 202-3 arranged along a first horizontal plane Q1. First horizontal plane Q1 corresponds to a nominal position of receiver units 202 at a predetermined wind speed. Also shown in FIG. 6 are second and third horizontal planes Q2, Q3. Second horizontal plane Q2 corresponds to a position of receiver units 202 at a wind speed that is greater than the predetermined wind speed. Third horizontal plane Q3 corresponds to a position of receiver units 202 at a wind speed that is less than the predetermined wind speed. As schematically illustrated in FIG. 6, receiver units 202 are each located within a region of incidence C. Region of incidence C is formed by first and second transmission lights 13.1, 13.2 (see FIG. 1B).

First through third receiver units 202-1 through 202-3 in FIG. 6 each correspond to receiver unit 20 in FIG. 1B. First through third receiver units 202-1 through 202-3 are disposed at a plurality of positions along the longitudinal extent of rotor blade 1 (i.e., one behind the other in the Y-direction) so as to form a plurality of measurement points for the torsion measurement. This enables torsion measurement at a plurality of measurement points within a line of sight (i.e., first line of sight A1 in FIG. 5a) or within a segment of rotor blade 1 (the segment extending between first and second positions P1, P2 in FIG. 5a).

By means of the above-mentioned arrangement, it is achieved that the reception of first and second transmission lights 13.1, 13.2 by first through third receiver units 202-1 through 202-3 is enabled or maintained for any predetermined curvature T1 of rotor blade 1. First through third receiver units 202-1 through 202-3 are in particular arranged such that they do not block each other's view of the transmitter (i.e., transmitter unit 10 in FIG. 1B).

For example, first and/or second light source(s) 12.1, 12.2 are each an incoherent light source, preferably an LED (e.g., an LED having a high output) or a laser.

Referring to FIG. 1B, first light source 12.1 and first transmitter-side polarizer 14.1 are fixedly connected with each other. It is also advantageous if first transmission light 13.1 has a relatively small divergence, so that first transmission light 13.1 impinges substantially only on the pair formed by first and second detector elements 24.1, 24.2 (and not on inner side surfaces of rotor blade 1). On the other hand, the area of reception determined by the divergence should be of such a size that the pair formed by first and second detector elements 24.1, 24.2 does not leave this area of reception, in particular when rotor blade 1 bends.

First and second detector elements 24.1, 24.2 are each formed, for example, by a photodiode.

Referring to FIG. 1B, first and second detector elements 24.1, 24.2 are fixedly connected with first and second receiver-side polarizers 22.1, 22.2, respectively. First and second detector elements 24.1, 24.2 preferably serve for measuring two orthogonally oriented polarization states (i.e., angle=90°), denoted, for example, as s-Pol and p-Pol. Without torsion of rotor blade 1, the polarizing direction of first transmission light 13.1 is, for example, oriented at an angle of 45° (reference angle) to the respective polarization plane of first and second receiver-side polarizers 22.1, 22.2. This arrangement is advantageous with respect to the analysis. However, other polarization state orientations between elements 22.1, 22.2 of receiver unit 20 (e.g., angles≠90°) are also conceivable.

Output signal S1 represents a measure of first torsion $\phi_1$ (i.e., a measure of the angle $\phi_1$ of the first torsion). Output signal S1 is, for example, transmitted to a controller of the wind turbine generator system.

Further details of the operation of the sensor assembly will be described below (see analysis unit 26 according to FIG. 1B).

For example, first and second measurement signals 25.1, 25.2 are given by the following relationships:

$$I_p = \alpha I_0 \cdot \cos^2\left(\phi_1 + \frac{\pi}{4}\right) + I_{Pd} \quad \text{(equation 1)}$$

$$I_s = \beta I_0 \cdot \sin^2\left(\phi_1 + \frac{\pi}{4}\right) + I_{Sd} \quad \text{(equation 2)}$$

where $I_p$ and $I_s$ are photo-currents (measurement signals) of first and second detector elements 24.1, 24.2, respectively, and indices s and p denote, for example, orthogonally related polarization states. Furthermore, $\alpha$, $\beta$ are linearity constants of first and second detector elements 24.1, 24.2. It should in particular be noted that the linearity constants $\alpha$, $\beta$ of first and second detector elements 24.1, 24.2 are different (i.e., a $\alpha \neq \beta$). $I_0$ is the nominal photo-current received by first and second detector elements 24.1, 24.2. $I_{Pd}$ and $I_{Sd}$ are dark currents of first and second detector elements 24.1, 24.2, respectively. (Angle $\phi_1$ corresponds to a polarization rotation or deviation of the angle of the polarization direction from the reference angle caused by a change in the torsion of rotor blade 1.)

The aforementioned measurement signals $I_p$ and $I_s$ are compensated in a first step. To this end, initially, the dark currents $I_{Pd}$ and $I_{Sd}$ are measured (which is referred to as dark current compensation). During dark current compensation, the first operating mode is activated (i.e., first and second light sources 12.1, 12.2 are switched off).

Once the dark currents $I_{Pd}$ and $I_{Sd}$ are known, the linearity constants $\alpha$, $\beta$ of the two detector elements 24.1, 24.2 are determined. To this end, the second operating mode is activated (i.e., first light source 12.1 is switched off and second light source 12.2 is switched on). The two detector elements 24.1, 24.2 now measure the same (identical levels of) light intensity, so that measurement signals $I_p$ and $I_s$ signals must be identical. Consequently, differences in measurement signals $I_p$ and $I_s$ are caused only by linearity constants $\alpha$, $\beta$ and can therefore be compensated.

By means of the sensor assembly, measurement signals $I_p$ and $I_s$ are scaled to the same value (e.g., gain matching or scaling of the photo-currents after an analog-to-digital conversion in a digital section of analysis unit 26).

Once the parameters $\alpha$, $\beta$, $I_{Pd}$ and $I_{Sd}$ are known, the above two relationships (equations 1 and 2) can be simplified:

$$I_p = I_0 \cdot \cos^2\left(\phi_1 + \frac{\pi}{4}\right) \quad \text{(equation 3)}$$

$$I_s = I_0 \cdot \sin^2\left(\phi_1 + \frac{\pi}{4}\right) \quad \text{(equation 4)}$$

Then, the normal operation (torsion measurement) can be started in a second step. To this end, the third operating mode is activated (i.e., first light source 12.1 is switched on and second light source 12.2 is switched off). Further to this end, the difference and the sum of measurement signals $I_p$ and $I_s$ are calculated and divided one by the other to obtain first output signal S1:

$$S1 = \frac{I_p - I_s}{I_p + I_s} = \frac{I_0\left[\cos^2\left(\phi_1 + \frac{\pi}{4}\right) - \sin^2\left(\phi_1 + \frac{\pi}{4}\right)\right]}{I_0\left[\cos^2\left(\phi_1 + \frac{\pi}{4}\right) + \sin^2\left(\phi_1 + \frac{\pi}{4}\right)\right]} \quad \text{(equation 5)}$$

Using the known relationships $\cos^2\phi_1 - \sin^2\phi_1 = \cos(2\phi_1)$ and $\cos^2\phi_1 + \sin^2\phi_1 = 1$, equation 5 can be converted to:

$$S1 = \cos\left(2\phi_1 + \frac{\pi}{2}\right) = \sin(2\phi_1) \quad \text{(equation 6)}$$

Then, the approximation $$S1 \sim 2\phi_1 \quad \text{(equation 7)}$$

applies to small angles.

Thus, first output signal S1 represents the measure $2\phi_1$. In particular, first output signal S1 is proportional to twice the angle $\phi_1$ of the first torsion of rotor blade 1. (Angle $\phi_1$ corresponds in particular to first torsion $\phi_1$.)

System 100 according to FIG. 1B is preferably disposed inside rotor blade 1. Alternatively, system 100 according to FIG. 1B may also be disposed externally on rotor blade 1. Transmitter unit 10 of system 100 according to FIG. 1B and receiver unit 20 of system 100 according to FIG. 1B are in particular rigidly connected to rotor blade 1.

To prevent the torsion measurement from being disturbed by stray light within rotor blade 1, two measures, in particular, are possible. On the one hand, the dark current compensation may be performed at a relatively high rate such as, for example, once per second or faster. Stray light, which manifests itself basically in the same way as a dark current, can thus be attributed to the dark current and be accounted for during dark current compensation and in the calculation of angle $\phi_1$.

On the other hand, by a preferably high-frequency modulation of first and/or second light source(s) 12.1, 12.2 and an analysis of the received signals (i.e., first and second modulated measurement signals 25.1, 25.2), unmodulated light components at this particular modulation frequency can be eliminated (so-called "lock-in amplifier principle"). This also avoids the above-mentioned disturbance of the torsion measurement by stray light.

Alternatively or in addition, the aforementioned modulation may be used to distinguish the segments (i.e., metrology blocks) along the metrology chain (see FIG. 5b).

The previously described compensation (i.e., the above-mentioned first and second steps) may be performed repeatedly (continuously) by cyclically changing (switching) between the first through third operating modes. This may be accomplished by a modulation (e.g., on-off-keying) of first and second light sources 12.1, 12.2.

Embodiments of the invention have in particular the following advantages. There is a high degree of ruggedness against environmental influences that affect dark currents and signal amplitudes (parameters $\alpha$, $\beta$), such as temperature, humidity, stray light, seasons, etc. This results from the possibility of signal compensation (i.e., compensation of measurement signals $I_p$ and $I_s$). This signal compensation can be performed online; i.e., during operation, in particular long-term operation, of the wind turbine generator system. In addition, there is provided the possibility of torsion measurement within rotor blade 1. This allows the torsion measurement to be performed regardless of the weather.

In comparison to known camera-based systems, which are based on image recognition and require relatively large marks for image recognition in order to achieve sufficient sensitivity, embodiments of the invention avoid the problem of the lack of compactness of these marks. Embodiments of the invention enable a compact design (i.e., small transmitter and receiver units 10, 20). This in turn facilitates the assembly and installation of the sensory assembly and also makes it possible to reduce the susceptibility of the sensory assembly to destruction by manufacturing residues which may fall down (e.g., lumps of resin of up to 500 g).

Embodiment of the invention enable torsion measurement with a relatively high bandwidth (i.e., up to several kHz). In comparison, the known camera-based systems only have a maximum possible bandwidth in the range of 25 Hz to 50 Hz. In addition, by the (optional) use of a metrology chain (see FIG. 5b), torsion measurement is achieved under all load conditions (e.g., bending of rotor blade 1 in the positive/negative Z-direction). Furthermore, embodiments of the invention enable torsion measurement using relatively simple, inexpensive components (light sources, photodiodes, polarizers, etc.). This is an advantage, especially over the known camera-based systems with expensive cameras and complex (computationally intensive) image recognition.

The sensor assembly according to the fifth through ninth exemplary embodiments differs from the sensor assembly according to the first exemplary embodiment by the following structural features: The sensor assembly has a beam-splitting element 36; 38 disposed behind first light source 12.1 in the direction of light propagation and used for splitting a beam $\alpha$; $\beta$; $\gamma$ of first transmission light 13.1 into at least a first sub-beam $\alpha1$; $\beta1$; $\gamma1$ and a second sub-beam $\alpha2$; $\beta2$; $\gamma2$. First sub-beam $\alpha1$; $\beta1$; $\gamma1$ and second sub-beam $\alpha2$; $\beta2$; $\gamma2$ have the same intensity or a fixed ratio of intensity. First detector element 24.1 and second detector element 24.2 are arranged and adapted such that first detector element 24.1 receives first sub-beam $\alpha1$; $\beta1$; $\gamma1$ and second detector element 24.2 receives second sub-beam $\alpha2$; $\beta2$; $\gamma2$.

A fixed ratio of intensity is understood to mean that beam-splitting element 36; 38 performs splitting at a ratio of intensity (e.g., 47/53) that is the same for all angles of incidence. It should be noted that beam $\alpha$; $\beta$; $\gamma$ corresponds to a "nominal" position of rotor blade 1 or is produced by a displacement of a transmitter unit (or a portion of the transmitter unit) relative to a receiver unit due to a wind load.

In the fifth through seventh exemplary embodiments, a transmitter unit 10 is formed by elements 12.1, 14.1. In the eighth exemplary embodiment, a first portion 10.1 of a transmitter unit 10 is formed by elements 12.1, 14.1. Further, in the eighth exemplary embodiment, a second portion 10.2 of transmitter unit 10 is formed by an additional light source. The transmitter unit 10 according to the fifth through seventh exemplary embodiments and the first portion 10.1 of the transmitter unit 10 according to the eighth exemplary embodiment are used to generate the beam $\alpha$; $\beta$; $\gamma$ of first transmission light 13.1 (see FIGS. 7 through 10). In FIGS. 7 through 10, an optical axis O1' is shown. Optical axis O1' is in each case parallel to the third direction (Y-direction) (which is, of course, not exactly true for a bent rotor blade 1) an extends through first light source 12.1.

Figure 7:
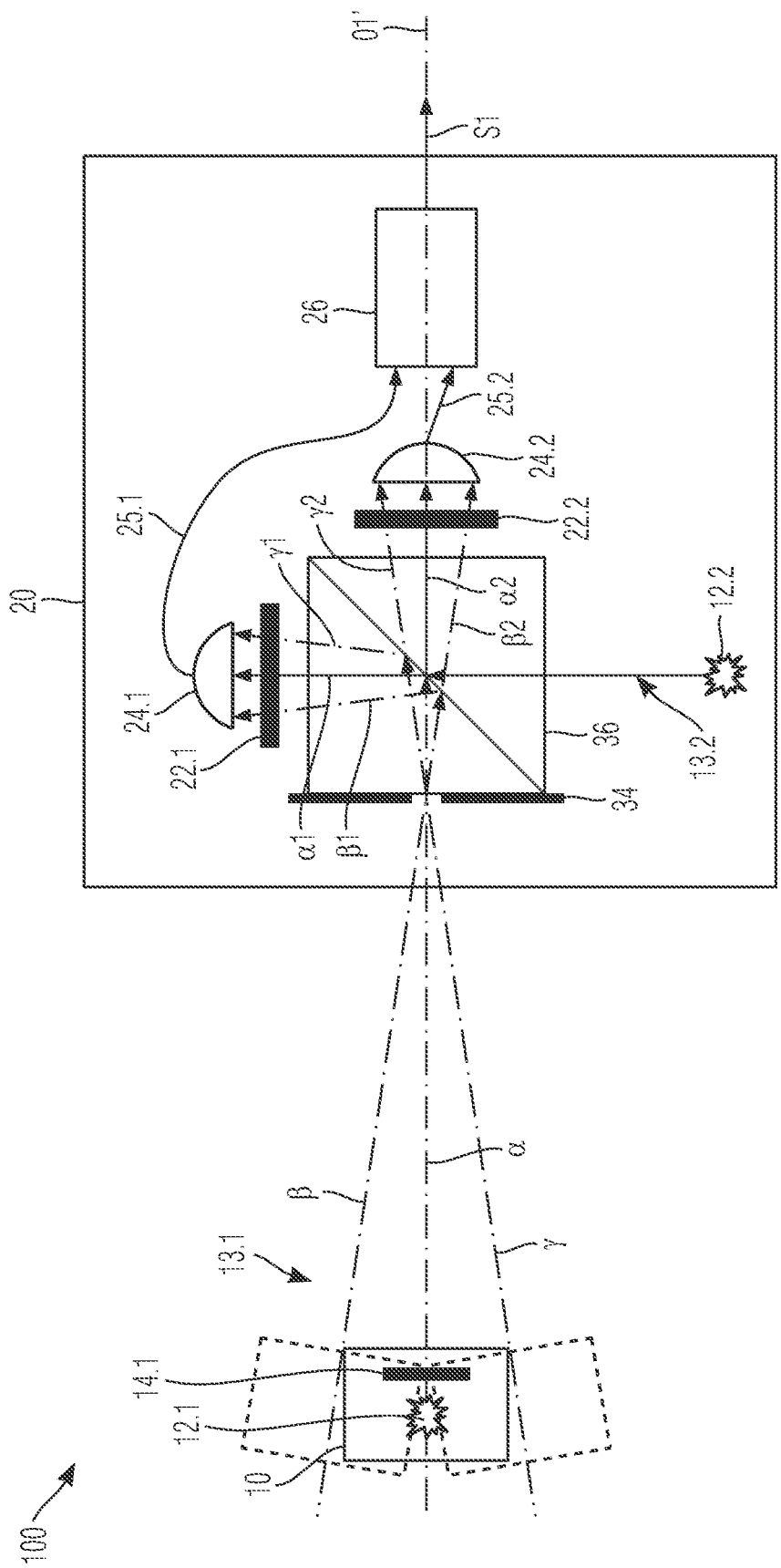
FIG. 7 is a block diagram of an exemplary sensor assembly in accordance with a fifth exemplary embodiment.
Figure 8:
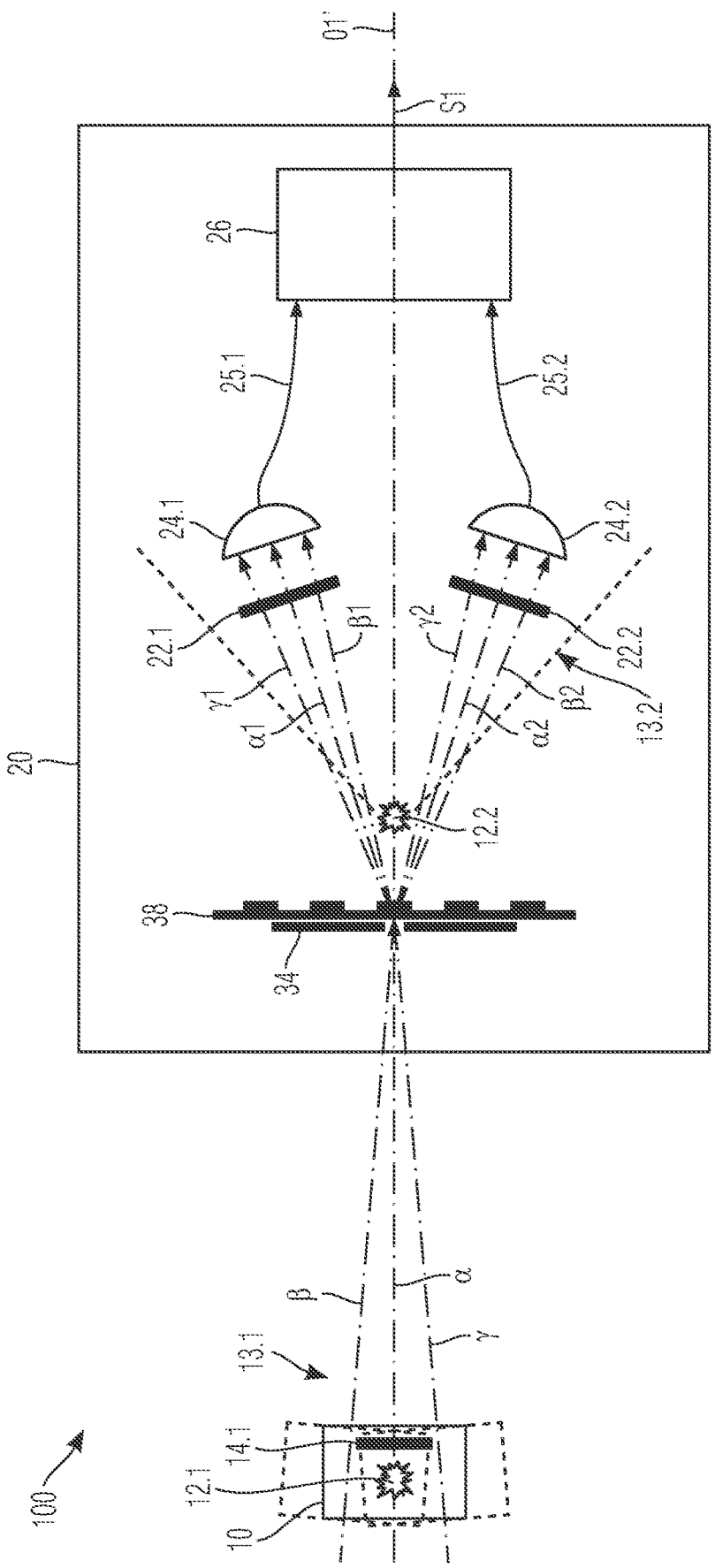
FIG. 8 is a block diagram of an exemplary sensor assembly in accordance with a sixth exemplary embodiment.
Figure 9:
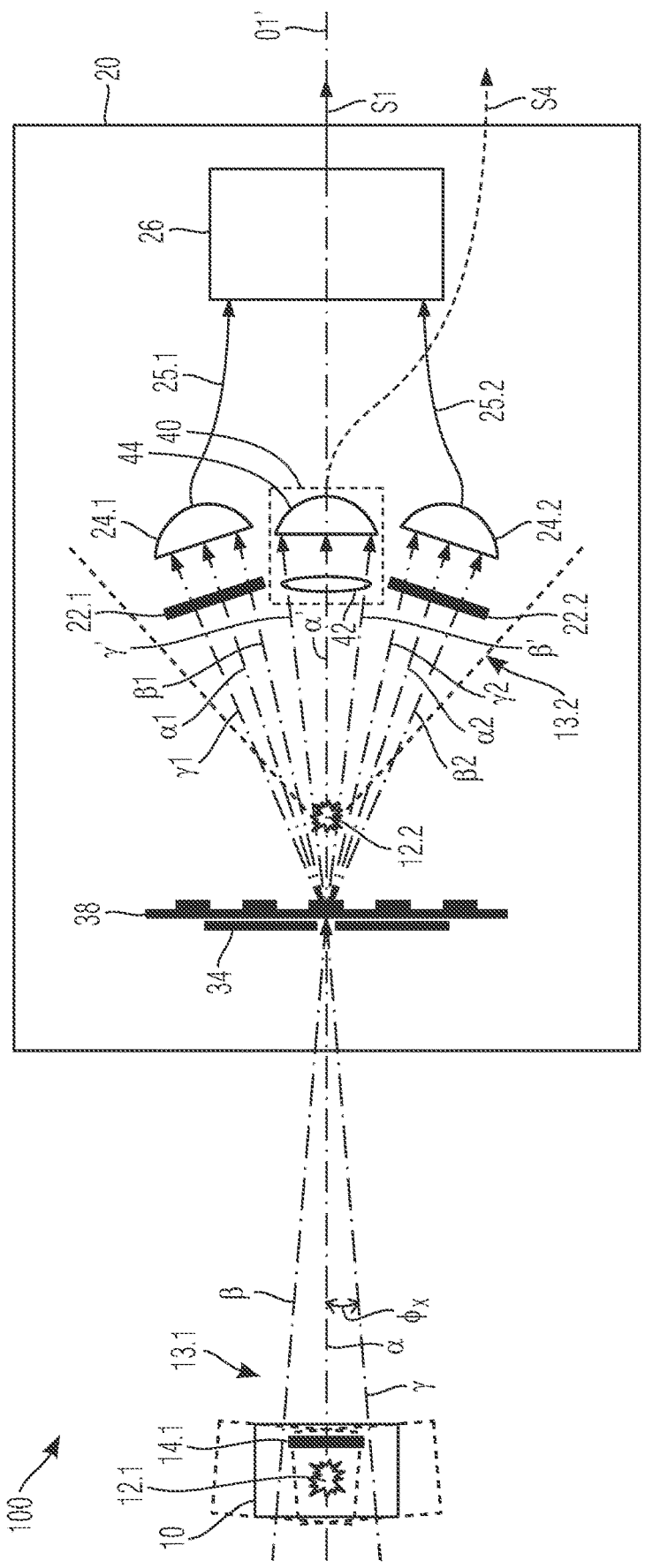
FIG. 9 is a block diagram of an exemplary sensor assembly in accordance with a seventh exemplary embodiment.
Figure 10:
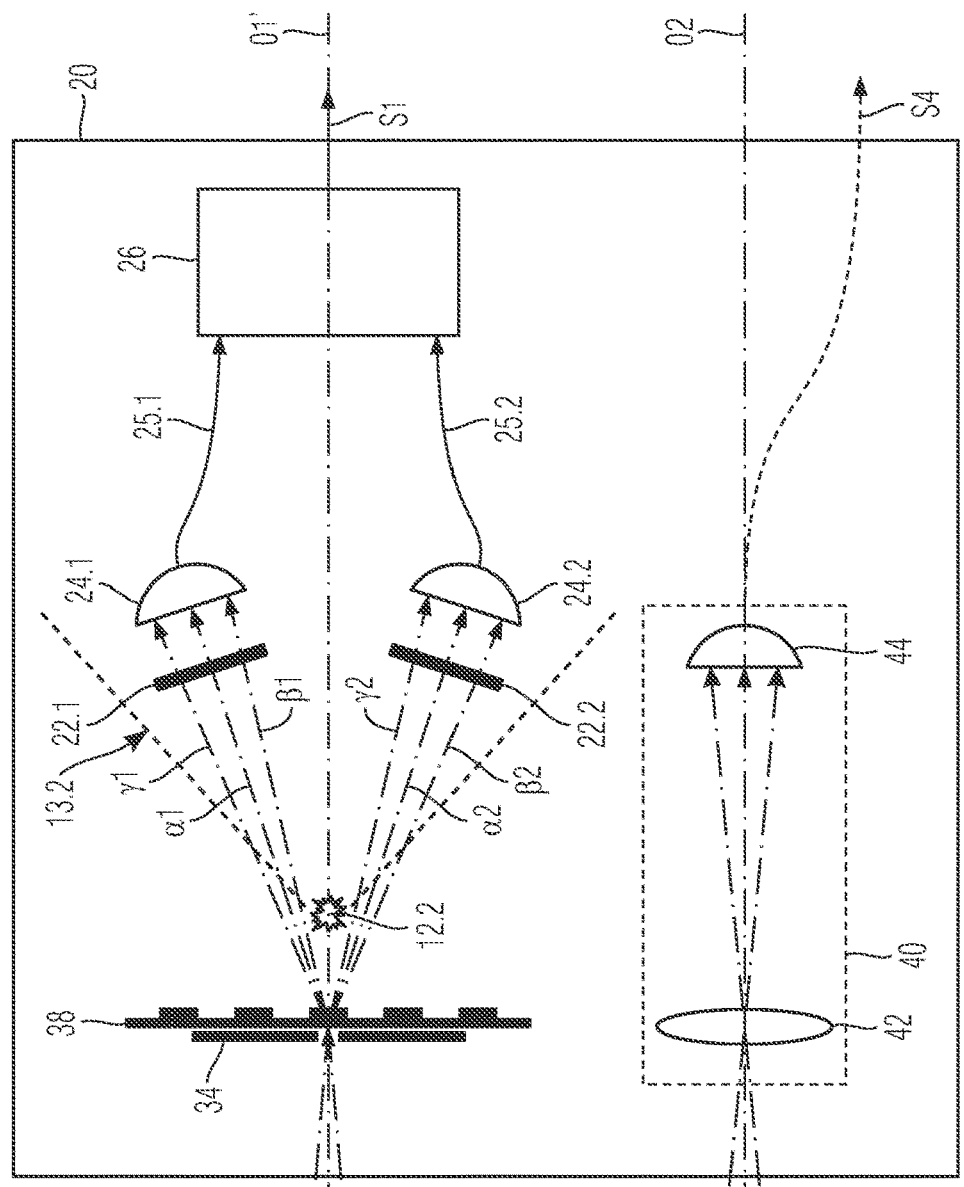
FIG. 10 is a block diagram of an exemplary sensor assembly in accordance with an eighth exemplary embodiment.

Beam $\alpha$ is produced when the transmitter unit 10 according to FIGS. 7 through 9 or the first portion 10.1 of the transmitter unit 10 according to FIG. 10 is in a first position. Beam $\beta$ is produced when the transmitter unit 10 according to FIGS. 7 through 9 or the first portion 10.1 of the transmitter unit 10 according to FIG. 10 is in a second position. Beam γ is produced when the transmitter unit 10 according to FIGS. 7 through 9 or the first portion 10.1 of the transmitter unit 10 according to FIG. 10 is in a third position. These first through third positions correspond to an initial position (i.e., an unbent state) or to respective different degrees of bending of rotor blade 1 in the degrees of freedom RX, RZ. Beam α assumes an angle of 0° relative to optical axis O1'. Beam β and beam γ each assume an angle different from 0° relative to optical axis O1'. In the following, the angle of beam γ is designated, by way of example, by $\phi_x$.

Beam α corresponds to the "nominal" position of rotor blade 1. Furthermore, beam β and beam γ correspond to respective load conditions of rotor blade 1, which can be caused by wind pressure.

Beam-splitting element 36; 38 compensates for a change in light intensity which is caused by an influence of an angle of an incident beam (i.e., beam α; β; γ of first transmission light 13.1) and which is detected by first and second detector elements 24.1, 24.2. This in turn makes it possible to prevent or at least reduce systematic errors of the measurement (torsion measurement).

In the fifth through ninth exemplary embodiments, the sensor assembly has an aperture stop 34 disposed in front of beam-splitting element 36; 38 in the direction of light propagation. Beam-splitting element 36; 38, in conjunction with aperture stop 34, substantially achieves what is referred to as "single-field scanning." This means that first sub-beam α1; β1; γ1 and second sub-beam α2; β2; γ2 originate from a common point (point of intersection in the plane of aperture stop 34) (see FIGS. 7 through 10 and 12), so that their intensities are substantially identical or stand in a fixed (constant) ratio of intensity to each other at all angles of incidence. Furthermore, as shown in FIGS. 7 through 10 and 12, first sub-beam α1; β1; γ1 and second sub-beam α2; β2; γ2 strike first and second detector elements 24.1, 24.2, respectively, without resulting in an, in particular asymmetric, truncation of beam profiles of the two sub-beams at the two detector elements 24.1, 24.2. In this way, a difference between a light intensity measured by first detector element 24.1 and a light intensity measured by second detector element 24.2, or a change in the ratio of intensity, is avoided. This in turn makes it possible to prevent effects on the torsion measurement.

In the fifth exemplary embodiment, beam-splitting element 36; 38 is in particular a non-polarizing beam splitter 36 (neutral beam splitter). Non-polarizing beam splitter 36 is used to split beam α; β; γ of first transmission light 13.1. Furthermore, non-polarizing beam splitter 36 is used for coupling-in of second transmission light 13.2 of second light source 12.2. Second light source 12.2 and the two detector elements 24.1, 24.2 are disposed in a fixed positional relationship with respect to each other. Furthermore, in the fifth exemplary embodiment, a receiver unit 20 is formed by elements 24.1, 24.2, 22.1, 22.2, 26, 36, 34 and 12.2.

As an alternative to non-polarizing beam splitter 36, a polarization beam splitter (PBS) may be used.

In the sixth exemplary embodiment, beam-splitting element 36; 38 is in particular a grating 38 (FIG. 8, transmission grating). The grating 38 according to FIG. 8 is used to split beam α; β; γ of first transmission light 13.1 into first sub-beam α1; β1; γ1 ($-1^{st}$ diffraction order) and second sub-beam α2; β2; γ2 ($+1^{st}$ diffraction order). Preferably, the grating 38 according to FIG. 8 has a line direction that is parallel to the second direction (Z-direction or main bending direction). In this case, moreover, the polarization direction of the linearly polarized light (first transmission light 13.1) is also parallel to the second direction. Due to this, the splitting ratio of the grating 38 according to FIG. 8, which is used to produce first sub-beam α1; β1; γ1 and second sub-beam α2; β2; γ2, does not change when rotor blade 1 bends in the second direction (Z-direction or main bending direction). Furthermore, by suitable selection of grating parameters, the grating 38 according to FIG. 8 can be configured such that, when rotor blade 1 bends in the first direction (X-direction or secondary bending direction), the splitting ratio changes only slightly, so that an error contribution to the torsion measurement is negligible.

As shown in FIG. 8, second light source 12.2 is disposed between grating 38 and the two detector elements 24.1, 24.2 (and between grating 38 and the two receiver-side polarizers 22.1, 22.2). First sub-beam α1; β1; γ1 and second sub-beam α2; β2; γ2 lie in a first plane (first X-Y plane). Second light source 12.2 lies in a second plane (second X-Y plane). The first X-Y plane and the second X-Y plane are offset from one another in the second direction (Z-direction). For example, the first X-Y plane is disposed above the second X-Y plane. As shown in FIG. 8, second transmission light 13.2 of second light source 12.2 strikes the two detector elements 24.1, 24.2 (with second transmission light 13.2 propagating obliquely upward toward the two detector elements 24.1, 24.2, starting from the second X-Y plane). Furthermore, in the sixth exemplary embodiment, a receiver unit 20 is formed by elements 24.1, 24.2, 22.1, 22.2, 26, 38, 34 and 12.2.

Figure 13A:
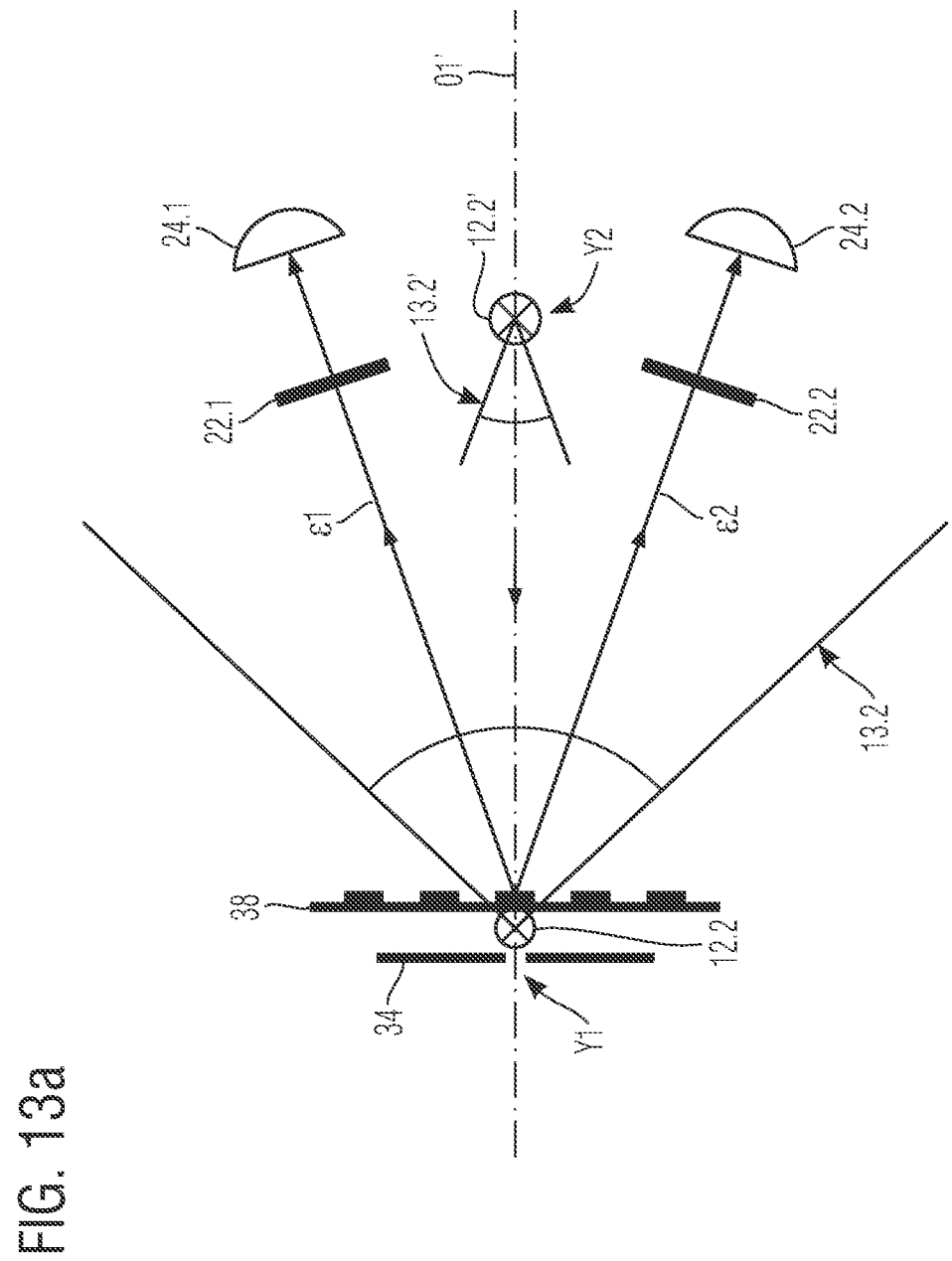
FIG. 13a is a schematic plan view of a beam path of a second light source of the sensor assembly according to FIG. 8, which second light source is disposed at an exemplary (alternative) first or second position.
Figure 13B:
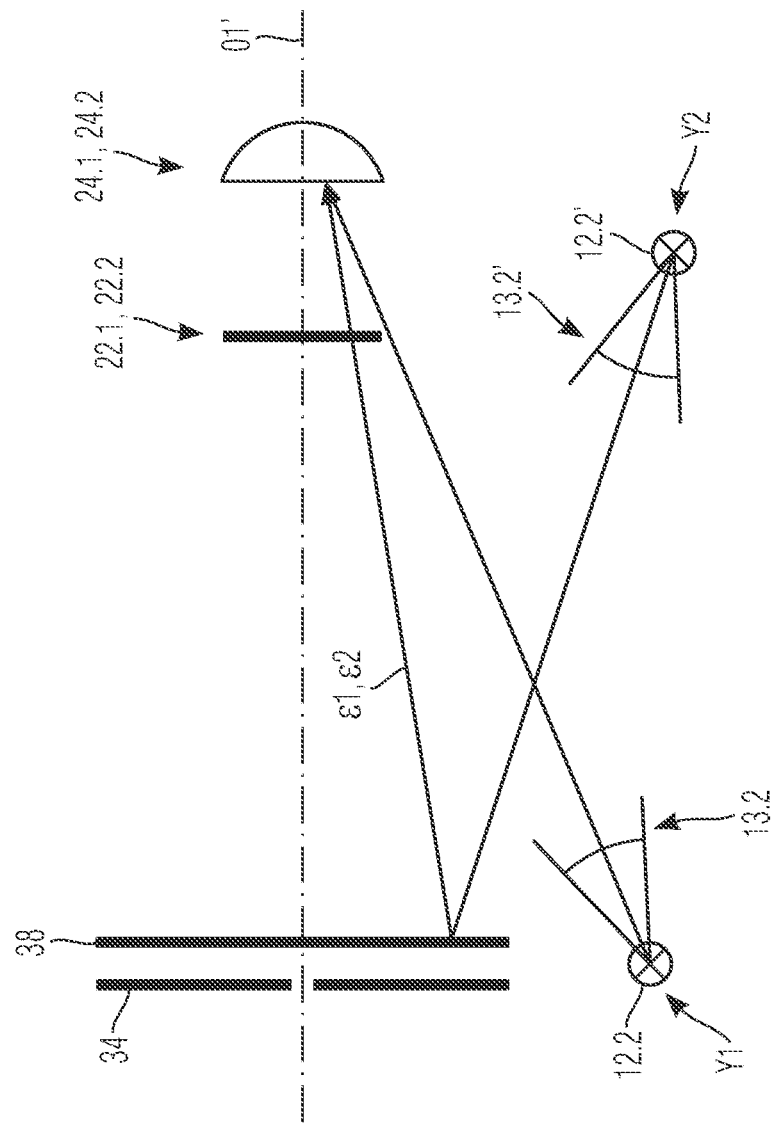

In accordance with FIG. 13a, second light source 12.2 of the sensor assembly according to FIG. 8 may be disposed in the region of grating 38 (e.g., at the alternative first position Y1 between aperture stop 34 and grating 38). At the same time, second light source 12.2 is disposed below the region of grating 38 (see FIG. 13b). As schematically illustrated in FIG. 13a, second transmission light 13.2 of second light source 12.2 propagates toward the two detector elements 24.1, 24.2 (i.e., to the right in FIG. 13a), starting from first position Y1. FIG. 13b also schematically shows that second transmission light 13.2 of second light source 12.2 propagates obliquely upward toward the two detector elements 24.1, 24.2, starting from first position Y1.

In accordance with FIG. 13a, second light source 12.2 (here light source 12.2') of the sensor assembly according to FIG. 8 may be disposed in the region of the two detector elements 24.1, 24.2 (e.g., at the alternative second position Y2). At the same time, second light source 12.2 is disposed below the region of the two detector elements 24.1, 24.2 (see FIG. 13b). As schematically illustrated in FIG. 13a, the second transmission light (here second transmission light 13.2') of second light source 12.2' propagates toward grating 38 (i.e., to the left in FIG. 13a), starting from second position Y2. FIG. 13b also schematically shows that second transmission light 13.2' of second light source 12.2' propagates obliquely upward toward grating 38, starting from second position Y2. Reflection at grating 38 produces sub-beams ε1, ε2, which correspond to the $+1^{st}$ diffraction order and to the $-1^{st}$ diffraction order, respectively. Sub-beam ε1 propagates toward first detector element 24.1 (i.e., to the right in FIG. 13a), starting from a point of incidence on grating 38. Sub-beam ε2 propagates toward second detector element 24.2 (i.e., to the right in FIG. 13a), starting from the point of incidence on grating 38. Furthermore, sub-beams ε1, ε2 each propagate obliquely upward toward the two detector elements 24.1, 24.2, starting from grating 38 (see FIG. 13b).

The positioning/configuration of the second light source 12.2 (or 12.2') according to FIGS. 13a, 13b can also be used analogously in the sensor assembly according to FIGS. 9, 10.

In the seventh exemplary embodiment, beam-splitting element 36; 38 is in particular a grating 38 (FIG. 9, transmission grating). The grating 38 according to FIG. 9 is used to split beam $\alpha$; $\beta$; $\gamma$ of first transmission light 13.1 into first sub-beam $\alpha 1$; $\beta 1$; $\gamma 1$, second sub-beam $\alpha 2$; $\beta 2$; $\gamma 2$, and an additional third sub-beam $\alpha'$; $\beta'$; $\gamma'$. First sub-beam $\alpha 1$; $\beta 1$; $\gamma 1$ corresponds to the $-1^{st}$ diffraction order. Second sub-beam $\alpha 2$; $\beta 2$; $\gamma 2$ corresponds to the $+1^{st}$ diffraction order. Third sub-beam $\alpha'$; $\beta'$; $\gamma'$ corresponds to the $0^{th}$ diffraction order. The sensor assembly according to FIG. 9 has a unit 40 for measuring an angle of beam $\alpha$; $\beta$; $\gamma$ of first transmission light 13.1 relative to optical axis O1'. This unit 40 is disposed between first and second detector elements 24.1, 24.2 so that it receives third sub-beam $\alpha'$; $\beta'$; $\gamma'$. This unit 40 has a lens 42 and a position-sensitive photodiode (PSD) 44 disposed behind lens 42 in the direction of light propagation.

Preferably, the grating 38 according to FIG. 9 is configured analogously to the grating 38 according to FIG. 8 in terms of the line direction and/or the grating parameters. PSD 44 is preferably a two-dimensional (2D) PSD.

The aforementioned unit 40 measures the angle of beam $\alpha$; $\beta$; $\gamma$ (e.g., angle $\phi_x$) and outputs it in the form of an output signal S4. Output signal S4 represents in particular a degree of bending of rotor blade 1 (degrees of freedom RX, RZ).

In other respects, the sensor assembly according to the seventh exemplary embodiment is substantially similar to the sensor assembly according to the sixth exemplary embodiment. Furthermore, in the seventh exemplary embodiment, a receiver unit 20 is formed by elements 24.1, 24.2, 22.1, 22.2, 26, 38, 34, 40 and 12.2

The seventh exemplary embodiment advantageously provides a sensor assembly for a combination measurement (i.e., torsion measurement in the degree of freedom RY in conjunction with an additional measurement of a bending of rotor blade 1 in the degrees of freedom RX, RZ). It should be noted that the degree of bending in the degrees of freedom RX, RZ is relative to a (known) distance between transmitter unit 10 and receiver unit 20. If the aforementioned unit 40 is incorporated into a plurality of metrology blocks of a metrology chain (e.g., analogously to the exemplary embodiment according to FIG. 5a), the combination measurement can be performed along rotor blade 1 in order to completely measure the torsion/bending of rotor blade 1.

The eighth exemplary embodiment differs from the sixth exemplary embodiment in that the additional light source is provided as a second portion 10.2 of transmitter unit 10 (see FIG. 10). An additional optical axis O2 extends through second portion 10.2 (additional light source). Further, in the eighth exemplary embodiment, the unit 40 including lens 42 and PSD 44 (see the seventh exemplary embodiment) is disposed on additional optical axis O2. For example, second portion 10.2 (additional light source) is used to generate unpolarized light. When second portion 10.2 is in a first position, beam $\delta 1$ is generated. When second portion 10.2 is in a second position, beam $\delta 2$ is generated. When second portion 10.2 is in a third position, beam $\delta 3$ is generated. The orientation (or angle) of beam $\delta 1$; $\delta 2$; $\delta 3$ corresponds to the orientation of (or angle) of beam $\alpha$; $\beta$; $\gamma$. Again, the angle of $\delta 3$ is designated, by way of example, by $\phi_x$. The unit 40 according to FIG. 10 measures, for example, the angle of beam $\delta 3$ (angle $\phi_x$) and outputs it in the form of output signal S4. Again, output signal S4 represents the degree of bending of rotor blade 1 (degrees of freedom RX, RZ).

Preferably, the optical axis O1' extending through first light source 12.1 of the first portion 10.1 of transmitter unit 10 and the additional optical axis O2 extending through second portion 10.2 (additional light source) are disposed parallel to each other.

In the eighth exemplary embodiment, a receiver unit 20 is formed by elements 24.1, 24.2, 22.1, 22.2, 26, 38, 34, 40 and 12.2.

FIG. 11 shows a schematic view of the unit 40 for measuring an angle (e.g., angle $\phi_x$). The unit 40 according to FIG. 11 corresponds to the unit 40 of the sensor assembly according to the seventh or eighth exemplary embodiment (see FIGS. 9 and 10). FIG. 11 shows a first beam (beam $\delta 1$) incident at an angle of 0° relative to an optical axis (e.g., optical axis O2) and a second beam (beam $\delta 3$) incident at an angle $\phi_x$ relative to optical axis O2. Also shown in FIG. 11 is an exemplary offset $\Delta x$ of a focal point of the incident second beam $\delta 3$ in a focal plane of lens 42. Lens 42 has a focal length f. PSD 44 measures the offset $\Delta x$ in the focal plane of lens 42. Angle $\phi_x$ can be determined by the following relationship:

$$\Delta x = \tan \phi_x \cdot f \qquad \text{(equation 8)}$$

The ninth exemplary embodiment differs from the sixth exemplary embodiment in that a transmitter unit 10 includes the first and second light sources 12.1, 12.2. A beam splitter 50 is disposed behind first and second light sources 12.1, 12.2 in the direction of light propagation. Beam splitter 50 is used to combine first transmission light of first light source 12.1 and second transmission light 13.2 of second light source 12.2. As shown in FIG. 12, the light of transmitter unit 10 combined by beam splitter 50 strikes a receiver unit 20. In FIG. 12, only the beam $\alpha$ extending parallel to optical axis O1' is shown by way of example.

In the ninth exemplary embodiment, a lens 46 is disposed between first light source 12.1 and first transmitter-side polarizer 14.1. Further, in the ninth exemplary embodiment, a lens 48 is disposed between second light source 12.2 and beam splitter 50.

In the ninth exemplary embodiment, transmitter unit 10 is formed by elements 12.1, 12.2, 14.1, 50, 46, 48. Furthermore, in the ninth exemplary embodiment, receiver unit 20 is formed by elements 24.1, 24.2, 22.1, 22.2, 26, 38, 34.

Instead of the aperture stop 34 according to the fifth through ninth exemplary embodiments, there may be also provided a first aperture stop and a second aperture stop disposed behind beam-splitting element 36; 38 in the direction of light propagation (alternative aperture stop assembly). This first aperture stop is disposed, for example, between first receiver-side polarizer 22.1 and first detector element 24.1. Further, this second aperture stop is disposed, for example, between second receiver-side polarizer 22.2 and second detector element 24.2. These first and second aperture stops may in particular be in the form of precision-manufactured apertures stops (apertures), which should be completely symmetrical with respect to the respective input apertures of the two detector elements 24.1, 24.2. The alternative aperture stop assembly is somewhat more complex and costly to manufacture as compared to the fifth through ninth exemplary embodiments, but is otherwise equivalent in terms of applicability.

In addition, lenses for focusing first sub-beam $\alpha 1$; $\beta 1$; $\gamma 1$ and second sub-beam $\alpha 2$; $\beta 2$; $\gamma 2$ may be provided instead of the aforementioned first and second aperture stops. This allows the two detector elements 24.1, 24.2 to be made smaller. Moreover, this allows for a greater angle of the incident beam (beam $\alpha$; $\beta$; $\gamma$) before truncation occurs at the two detector elements 24.1, 24.2.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A sensor assembly for measuring at least a first torsion of a rotor blade of a wind turbine generator system, the sensor assembly comprising:
    a first light source configured to generate light;
    a first transmitter-side polarizer disposed downstream of the first light source in a direction of light propagation and configured to generate linearly polarized light as a first transmission light;
    a second light source configured to generate unpolarized light as a second transmission light;
    a first detector element and a second detector element arranged and adapted to receive the first transmission light and the second transmission light; and
    a first receiver-side polarizer disposed upstream of the first detector element in the direction of light propagation and a second receiver-side polarizer disposed upstream of the second detector element in the direction of light propagation, an orientation of a polarization plane of the first receiver-side polarizer and an orientation of a polarization plane of the second receiver-side polarizer being different from one another,
    wherein the sensor assembly has first through third operating modes, the sensor assembly being configured to switch cyclically among the first through third operating modes.

2. The sensor assembly as recited in claim 1, wherein no transmitter-side polarizer is disposed between the second light source and a pair formed by the first and second detector elements.

3. The sensor assembly as recited in claim 1, wherein, in the first operating mode, the first and second light sources are switched off, wherein, in the second operating mode, the first light source is switched off and the second light source is switched on, and wherein, in the third operating mode, the first light source is switched on and the second light source is switched off.

4. The sensor assembly as recited in claim 1, further comprising a transmitter-side color filter disposed downstream of the first light source in the direction of light propagation and a receiver-side color filter disposed upstream of the first and second detector elements in the direction of light propagation, a pass-wavelength of the transmitter-side color filter and a pass-wavelength of the receiver-side color filter being the same.

5. The sensor assembly as recited in claim 4, wherein the transmitter-side color filter is associated with both the first and the second light sources.

6. The sensor assembly as recited in claim 1, wherein the sensor assembly is configured to modulate each of the first and/or second light source(s) with a predetermined frequency to generate the respective first and/or second transmission light(s) as a modulated transmission light in order to obtain a first modulated measurement signal generated by the first detector element and a second modulated measurement signal generated by the second detector element.

7. The sensor assembly as recited in claim 1, further comprising:
    a first transmitter-side optical waveguide coupled to the first light source and a second transmitter-side optical waveguide coupled to the second light source;
    a first transmitter-side lens element coupled to the first transmitter-side optical waveguide and a second transmitter-side lens element coupled to the second transmitter-side optical waveguide; and
    a first receiver-side optical waveguide coupled to the first detector element and a second receiver-side optical waveguide coupled to the second detector element, wherein the first and second light sources and the first and second detector elements are each disposed outside a longitudinally extending portion of the rotor blade.

8. The sensor assembly as recited in claim 1, further comprising a retroreflector disposed downstream of the first light source in the direction of light propagation and fixedly connected with the first transmitter-side polarizer, wherein the first light source, the first detector element and the second detector element are arranged side-by-side in a first direction perpendicular to a longitudinal axis of the rotor blade, and wherein the second light source is disposed between a pair formed by the first and second detector elements and the retroreflector.

9. The sensor assembly as recited in claim 1, further comprising a transmitter unit disposed at a first position and a plurality of transmitter/receiver units disposed along a bending line of the rotor blade at second through nth positions, wherein the transmitter unit includes the first light source, the first transmitter-side polarizer, and the second light source, wherein a first transmitter/receiver unit of the transmitter/receiver units includes the first and second detector elements and the first and second receiver-side polarizers, wherein the first transmitter/receiver unit includes a third light source configured to generate light and a second transmitter-side polarizer disposed downstream of the third light source in the direction of light propagation, wherein the third light source and the second transmitter-side polarizer are configured to generate linearly polarized light as a third transmission light, and wherein the first transmitter/receiver unit includes a fourth light source configured to generate unpolarized light as a fourth transmission light.

10. The sensor assembly as recited in claim 9, wherein the transmitter unit is configured such that the first and second transmission lights are generated with a predetermined first wavelength, wherein the first transmitter/receiver unit is configured such that the third and fourth transmission lights are generated with a predetermined second wavelength, and wherein the predetermined first wavelength and the predetermined second wavelength are different from each other.

11. The sensor assembly as recited in claim 1, wherein the first light source and the first transmitter-side polarizer are configured to generate the linearly polarized light as the first transmission light in such a way that a polarization direction of the linearly polarized light is parallel or perpendicular to a second direction, the second direction being defined by a predetermined curvature of the rotor blade.

12. The sensor assembly as recited in claim 1, further comprising an analysis unit configured to generate an output signal representative of a measure of the first torsion as a function of a first measurement signal generated by the first detector element and as a function of a second measurement signal generated by the second detector element.

13. The sensor assembly as recited in claim 1, wherein the first and second light sources are arranged relative to each other in such a way that the first and second light sources radiate substantially into the same solid angle.

14. The sensor assembly as recited in claim 1, wherein the first and/or second light source(s) are each an incoherent light source.

15. The sensor assembly as recited in claim 1, further comprising a beam-splitting element disposed downstream of the first light source in the direction of light propagation and configured to split a beam of the first transmission light into at least a first sub-beam and a second sub-beam, wherein the first sub-beam and the second sub-beam have the same intensity or a fixed ratio of intensity, and wherein the first detector element and the second detector element are arranged and adapted such that the first detector element receives the first sub-beam and the second detector element receives the second sub-beam.

16. The sensor assembly as recited in claim 15, further comprising an aperture stop disposed upstream of the beam-splitting element in the direction of light propagation.

17. The sensor assembly as recited in claim 15, wherein the beam-splitting element is a non-polarizing beam splitter or a grating.

18. The sensor assembly as recited in claim 17, wherein the beam-splitting element is the grating, wherein the grating is configured to split the beam of the first transmission light into the first sub-beam, the second sub-beam, and a third sub-beam, wherein the first sub-beam corresponds to the $-1^{st}$ diffraction order, wherein the second sub-beam corresponds to the $+1^{st}$ diffraction order, and wherein the third sub-beam corresponds to the $0^{th}$ diffraction order, the sensor assembly further comprising a unit configured to measure an angle of the beam of the first transmission light relative to an optical axis, wherein the unit is disposed between the first and the second detector elements so that it receives the third sub-beam, and wherein the unit has a lens and a position-sensitive photodiode disposed downstream of the lens in the direction of light propagation.

19. A sensor assembly for measuring at least a first torsion of a rotor blade of a wind turbine generator system, the sensor assembly comprising:
a first light source configured to generate light;
a first transmitter-side polarizer disposed downstream of the first light source in a direction of light propagation and configured to generate linearly polarized light as a first transmission light;
a second light source configured to generate unpolarized light as a second transmission light;
a first detector element and a second detector element arranged and adapted to receive the first transmission light and the second transmission light;
a first receiver-side polarizer disposed upstream of the first detector element in the direction of light propagation and a second receiver-side polarizer disposed upstream of the second detector element in the direction of light propagation, an orientation of a polarization plane of the first receiver-side polarizer and an orientation of a polarization plane of the second receiver-side polarizer being different from one another; and
a transmitter unit disposed at a first position and a plurality of transmitter/receiver units disposed along a bending line of the rotor blade at second through nth positions, wherein the transmitter unit includes the first light source, the first transmitter-side polarizer, and the second light source, wherein a first transmitter/receiver unit of the transmitter/receiver units includes the first and second detector elements and the first and second receiver-side polarizers, wherein the first transmitter/receiver unit includes a third light source configured to generate light and a second transmitter-side polarizer disposed downstream of the third light source in the direction of light propagation, wherein the third light source and the second transmitter-side polarizer are configured to generate linearly polarized light as a third transmission light, and wherein the first transmitter/receiver unit includes a fourth light source configured to generate unpolarized light as a fourth transmission light.

20. A sensor assembly for measuring at least a first torsion of a rotor blade of a wind turbine generator system, the sensor assembly comprising:
a first light source configured to generate light;
a first transmitter-side polarizer disposed downstream of the first light source in a direction of light propagation and configured to generate linearly polarized light as a first transmission light;
a second light source configured to generate unpolarized light as a second transmission light;
a first detector element and a second detector element arranged and adapted to receive the first transmission light and the second transmission light; and
a first receiver-side polarizer disposed upstream of the first detector element in the direction of light propagation and a second receiver-side polarizer disposed upstream of the second detector element in the direction of light propagation, an orientation of a polarization plane of the first receiver-side polarizer and an orientation of a polarization plane of the second receiver-side polarizer being different from one another,
wherein the first light source and the first transmitter-side polarizer are configured to generate the linearly polarized light as the first transmission light in such a way that a polarization direction of the linearly polarized light is parallel or perpendicular to a second direction, the second direction being defined by a predetermined curvature of the rotor blade.

* * * * *